July 17, 1962  R. A. PETERSON  3,045,207
WAVE TRANSMISSION SYSTEM
Filed July 15, 1955  11 Sheets-Sheet 1
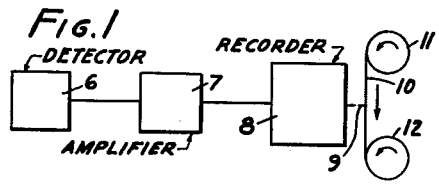
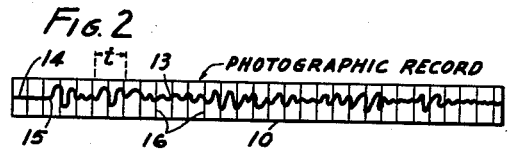
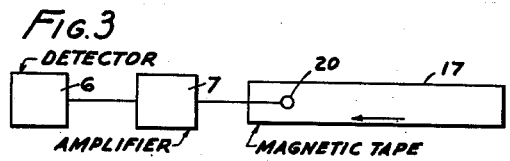
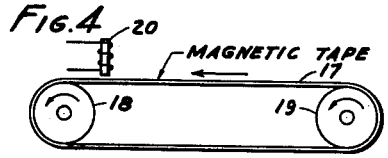
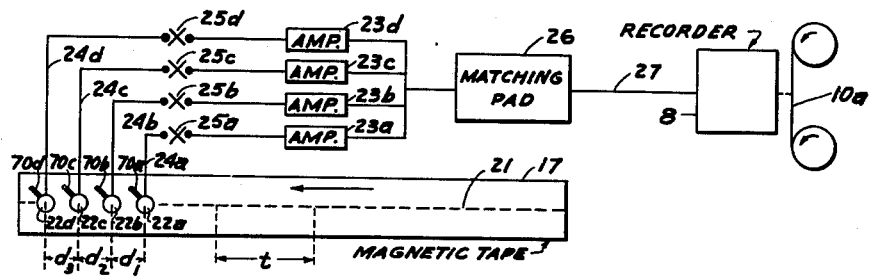
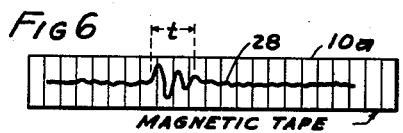
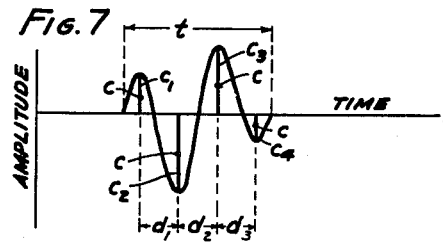
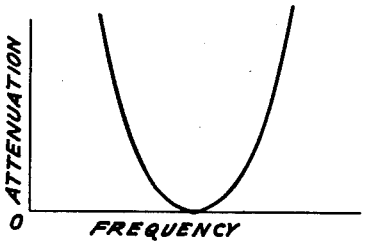
INVENTOR.
RAYMOND A. PETERSON
BY
P. Gordon Inglis
ATTORNEY.

July 17, 1962 R. A. PETERSON 3,045,207
WAVE TRANSMISSION SYSTEM
Filed July 15, 1955 11 Sheets-Sheet 2
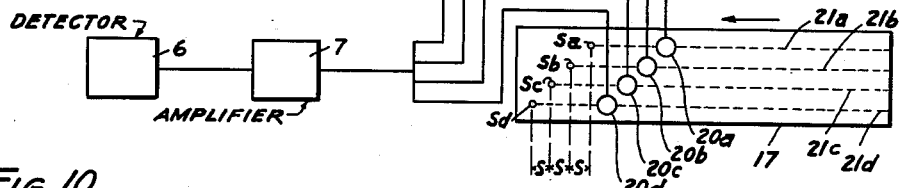
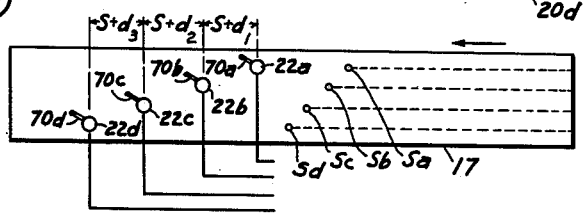
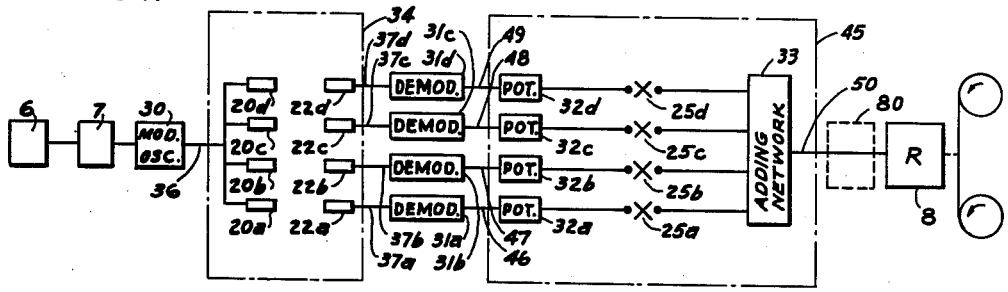
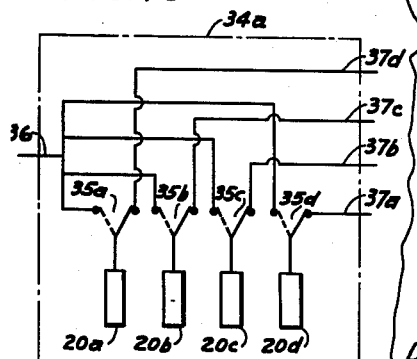
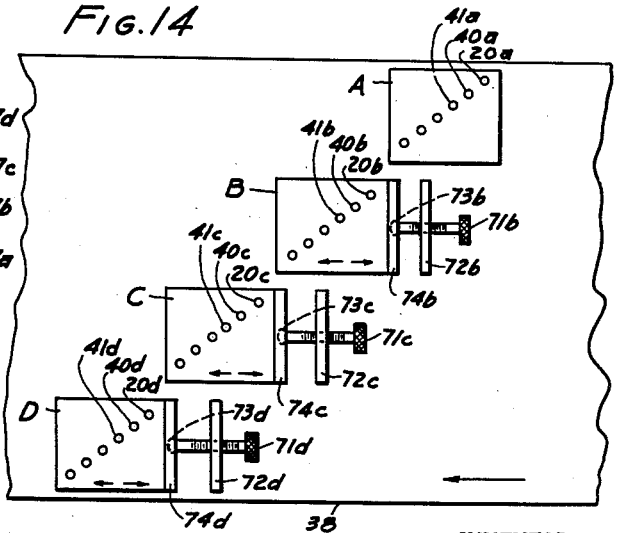
INVENTOR.
RAYMOND A. PETERSON
BY
D. Gordon Angus
ATTORNEY.

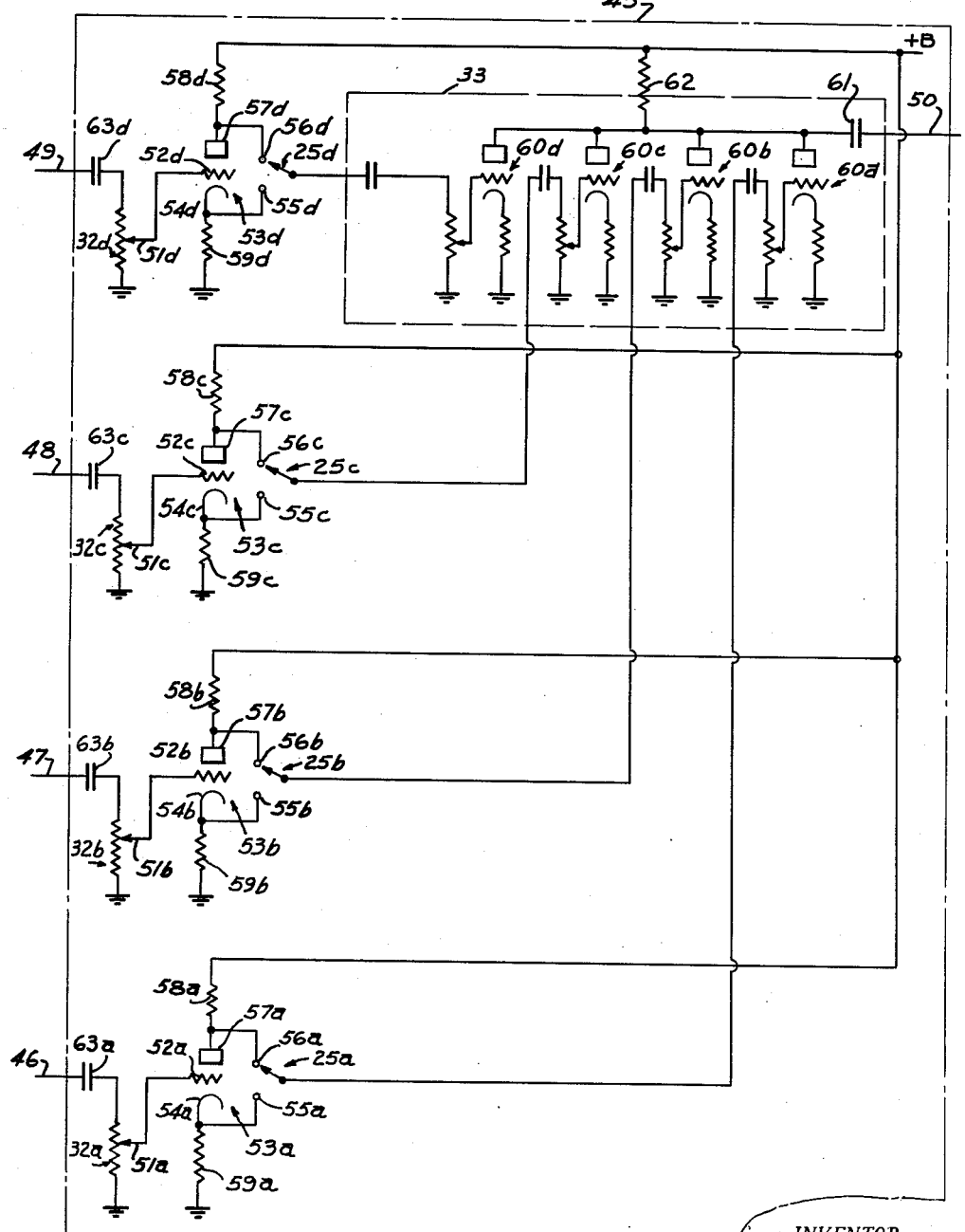

INVENTOR.
RAYMOND A. PETERSON

July 17, 1962  R. A. PETERSON  3,045,207
WAVE TRANSMISSION SYSTEM
Filed July 15, 1955  11 Sheets-Sheet 5

INVENTOR.
RAYMOND A. PETERSON
BY
ATTORNEY.

July 17, 1962 R. A. PETERSON 3,045,207
WAVE TRANSMISSION SYSTEM
Filed July 15, 1955 11 Sheets-Sheet 6

INVENTOR.
RAYMOND A. PETERSON
BY
ATTORNEY.

July 17, 1962 R. A. PETERSON 3,045,207
WAVE TRANSMISSION SYSTEM
Filed July 15, 1955 11 Sheets-Sheet 7
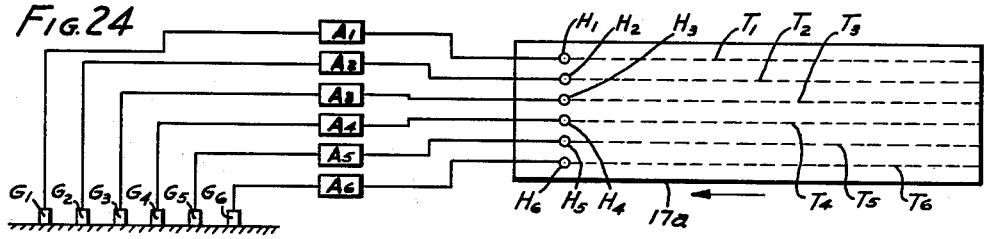
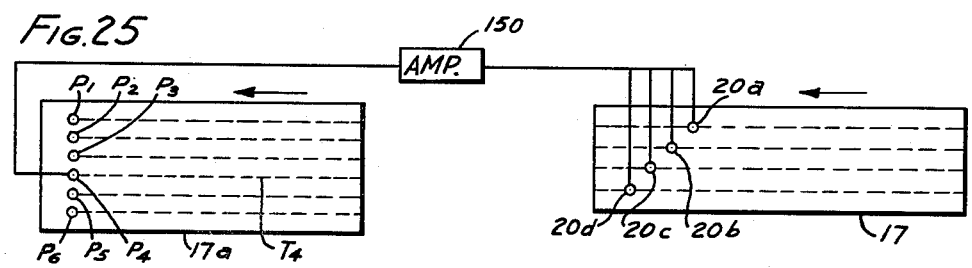
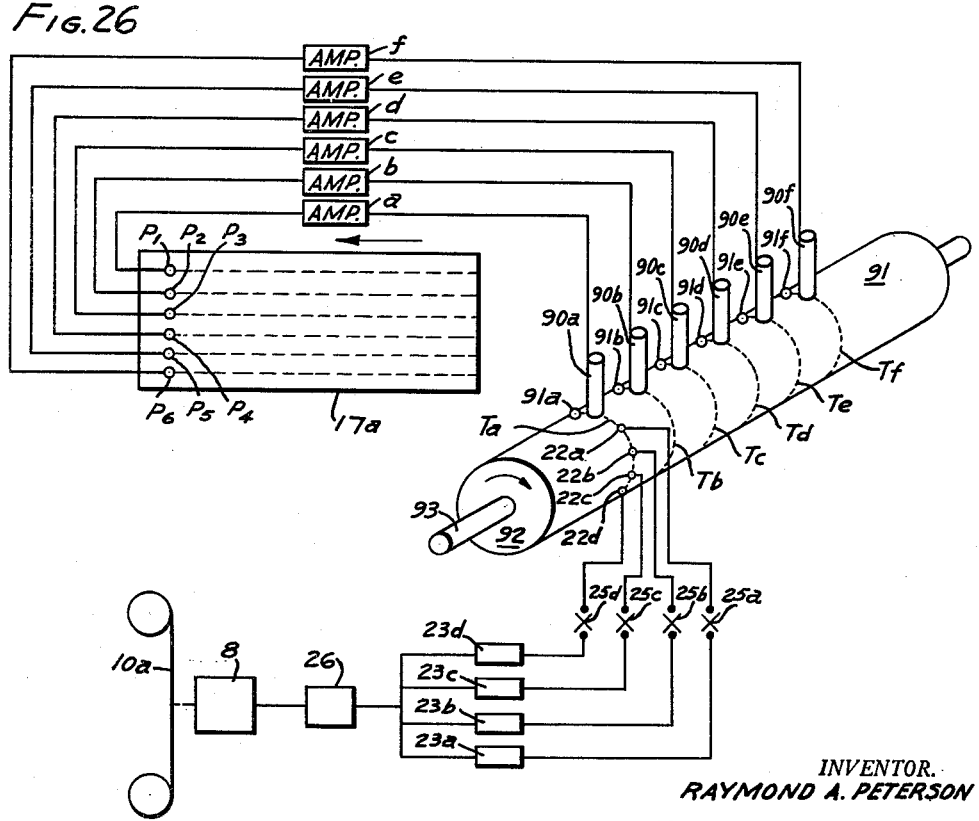
INVENTOR.
RAYMOND A. PETERSON
BY
ATTORNEY.

July 17, 1962 R. A. PETERSON 3,045,207
WAVE TRANSMISSION SYSTEM
Filed July 15, 1955 11 Sheets-Sheet 8

INVENTOR.
RAYMOND A. PETERSON
BY
ATTORNEY.

July 17, 1962  R. A. PETERSON  3,045,207
WAVE TRANSMISSION SYSTEM
Filed July 15, 1955  11 Sheets-Sheet 9
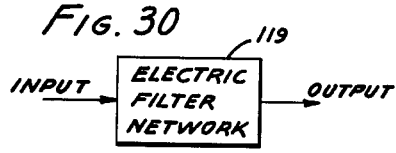
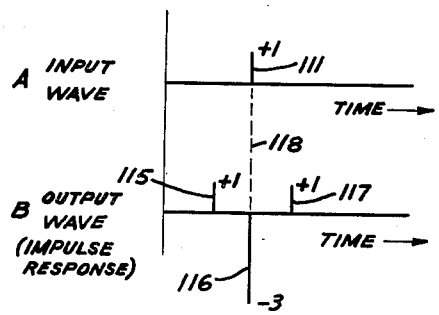
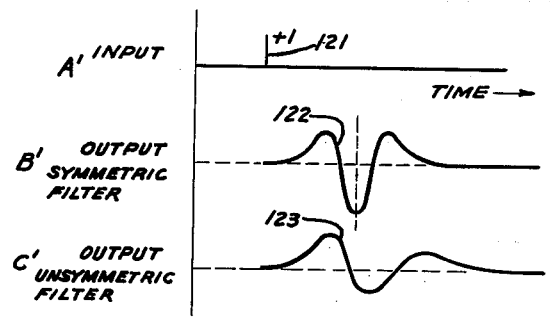
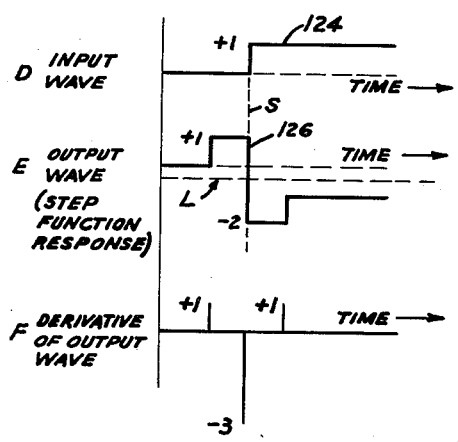
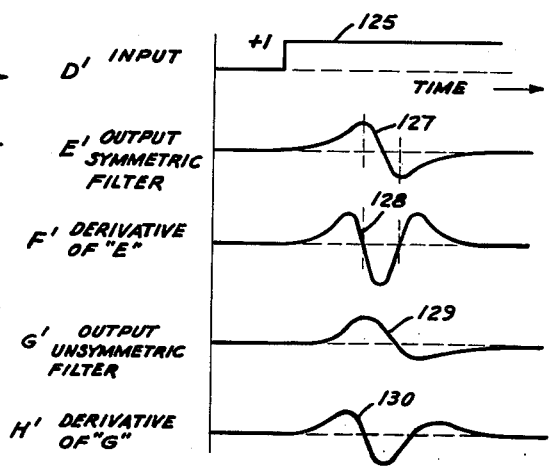
INVENTOR.
RAYMOND A. PETERSON
BY D. Gordan Angus
ATTORNEY.

July 17, 1962    R. A. PETERSON    3,045,207
WAVE TRANSMISSION SYSTEM
Filed July 15, 1955    11 Sheets-Sheet 10

INVENTOR.
RAYMOND A. PETERSON

BY
ATTORNEY.

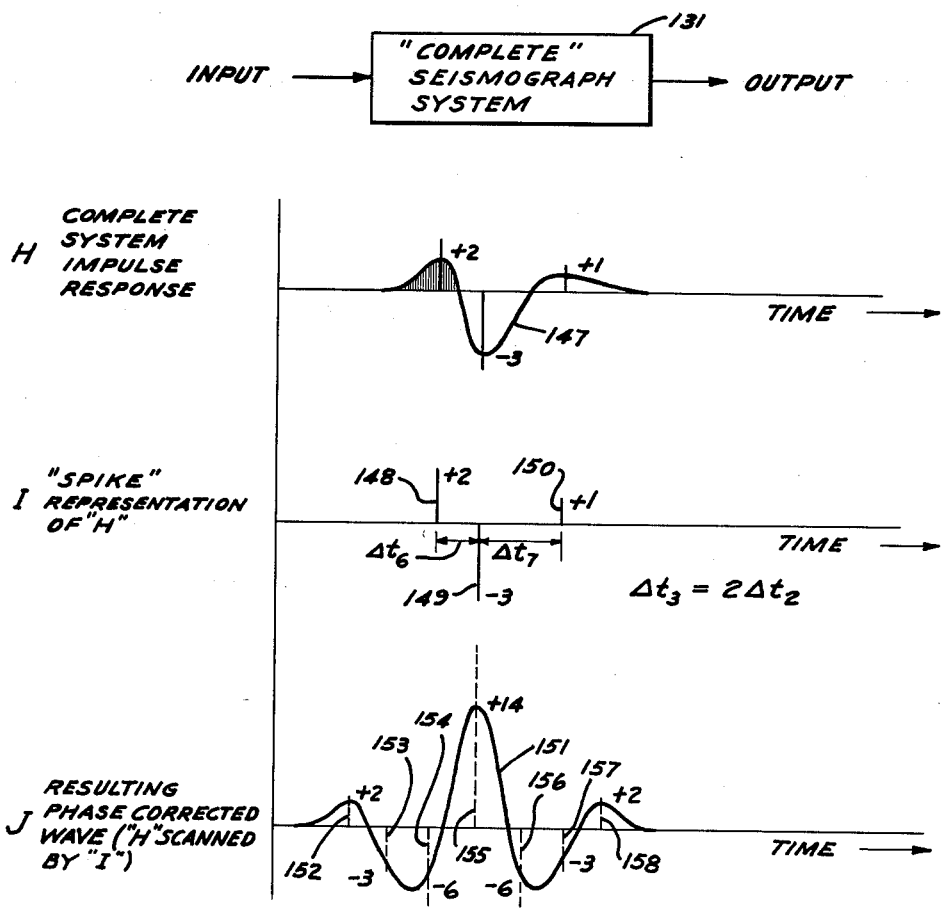

3,045,207
WAVE TRANSMISSION SYSTEM
Raymond A. Peterson, Altadena, Calif., assignor to United Geophysical Corporation, Pasadena, Calif., a corporation of California
Filed July 15, 1955, Ser. No. 522,234
2 Claims. (Cl. 340—15)

This invention relates to frequency selecting systems and more particularly to systems for selecting wave transients.

An object of the invention is to provide such a selecting system capable of distinguishing and developing wave transients from among other waves.

It is well known that wave motion occurs in various media such as the earth, air and water from sources such as explosions or other disturbances. Such waves ordinarily travel in various directions and may be reflected or refracted or diffracted in different degrees from objects or surfaces. The result is that such waves commonly travel at random through the medium at various frequencies and amplitudes.

It is desirable for some purposes to be able to select from among such random waves, a particular wave or transient. In general, such a wave transient or portion of a wave is of varying amplitude and changing frequency, but it usually has the characteristic that the frequencies or wave-lengths lie within a relatively narrow range. For example, while the various readily discernible random waves travelling through the medium may lie in the range of about 5 to 500 cycles per second, it is ordinarily true that the transient which it is desired to select may lie wholly in such a narrow range of frequency as the order of 40 to 50 cycles per second band width. Ordinarily, the transient can be sufficiently identified by developing a few of the adjacent peaks or lobes. To do this requires a frequency selective system capable of passing the extremely narrow band, for example, 40 to 50 cycles per second band width, or the like, while substantially discriminating against all others. Furthermore, since the frequency range of various transients is different, the selective system must be capable of such variation.

It will be understood, of course, that desired transients may lie at various regions in the frequency spectrum and also be of different band widths.

In accordance with the present invention there is provided a system capable of selecting such wave transients of varying amplitude and frequency and distinguishing them from other waves which may be masking them. The system comprises a means for detecting or picking up waves in a frequency range broad enough to be selected. The waves thus picked up by the detecting means are sent into a transmission medium and divided into a plurality of channels. A feature of the arrangement resides in the provision of polarity reversing means and time delay means and amplitude changing means in at least some of the channels so that the waves can be sent through the channels with different relative time delays, amplitudes and polarities. The waves from the channels are then combined to create a composite wave; and by proper selection of the time delays, amplitudes and polarities the transient can be developed from the random masking waves.

Another feature which it is possible to attain in accordance with the invention resides in combining wave information varying in space as well as in time. For example, a number of detectors can be located at different positions in space while the outputs of individual ones of the detectors are divided into separated channels whose transmissions are varied in time by time delaying means.

In a preferred arrangement of the invention the waves picked up by the detector are recorded, at least temporarily, on a recording medium of a type which can be played back. The record thus made is played back through a plurality of channels for the purpose of making a composite wave which can be made to appear on another record; and this is done in such a manner that the desired frequency range is selected while waves of other frequencies which may be masking the desired signal are substantially attenuated or cancelled out.

A preferred feature of the invention resides in a plurality of playback pickup elements arranged to have their positions adjusted relatively to each other along the record being played back. In this manner there are simultaneously picked up a plurality of different increments of the record spaced from each other by adjustable distances representing different time intervals.

The outputs of the several playback pickup elements are added or combined into a composite signal of which the second record is made. The selected wave or transient will appear on this second record, and will stand out from any masking waves, which are substantially minimized or cancelled.

Another feature resides in means for reversing the relative polarities of some or all of the several record signals picked up on the playback.

A related feature resides in means for adjusting the relative gain or amplitude of the signals from the several playback pickup elements.

According to a further feature, a signal track or channel may be recorded on a record from a detector, for example, during field operations, and then re-recorded later in a plurality of tracks or channels, for use in accordance with this invention.

A further aspect resides in the provision of a playback arrangement arrayed in such a manner that phase distortion is avoided. According to one possible arrangement, a symmetric pattern of heads or playback devices is used. According to another arrangement an anti-symmetric pattern is used. Combinations of symmetric and anti-symmetric patterns are within the contemplation of this invention.

A related feature resides in arranging playback devices or heads in a manner to compensate for phase distortion introduced by some other filtering means in the wave transmission system.

The foregoing and other features of the invention will be better understood from the following detailed description and the accompanying drawings, of which:

FIG. 1 shows in block diagram form a known system for receiving and recording waves;

FIG. 2 shows a record of waves made on the system of FIG. 1;

FIG. 3 is a block diagram of a system for recording received waves on a magnetic tape;

FIG. 4 shows an elevation view of the system of FIG. 3;

FIG. 5 shows in block diagram form a system for playing back the tape of FIGS. 3 and 4;

FIG. 6 shows a record made on the system of FIG. 5, in accordance with the present invention;

FIG. 7 shows graphically an enlarged wave on the record of FIG. 6, showing the relative amplitudes and time distances of peaks in the wave;

FIG. 8 is a curve showing an attenuation characteristic of the system of FIGS. 3 to 5;

FIG. 9 is a block diagram of a system used according to the invention, for recording received waves on a magnetic tape record, which can be used in place of the system of FIG. 3;

FIG. 10 shows an arrangement according to the invention for playing back the magnetic tape record of FIG. 9;

FIG. 11 shows another arrangement according to the invention which can be used in place of that shown in FIGS. 3 to 5;

FIG. 12 shows a specific circuit arrangement which can be used in the system of FIG. 11;

FIG. 13 shows a modification which can be used in the system of FIG. 11;

FIG. 14 shows an arrangement for recording and playing back a magnetic tape record where a number of wave receiving detectors are used;

FIG. 24 shows a system for recording signal tracks on tape from a plurality of different geophones in a seismic system;

FIG. 25 shows a system for re-recording on another tape a plurality of tracks from one of the channels on the tape of FIG. 24;

FIG. 26 shows another system for re-recording, and also playing back tracks recorded on a tape such as that in FIG. 24;

FIG. 28 illustrates the fact that a symmetric type head scanning pattern introduces no phase distortion;

FIG. 30 illustrates the effect of an anti-symmetric array of heads;

FIG. 31 illustrates the application of a unit step function to the system of FIG. 28;

FIG. 32 illustrates the application of a unit step function to the system of FIG. 30;

FIG. 36 illustrates an example of correction of phase distortion employing the method illustrated in FIGS. 33 to 35.

Figure 16:
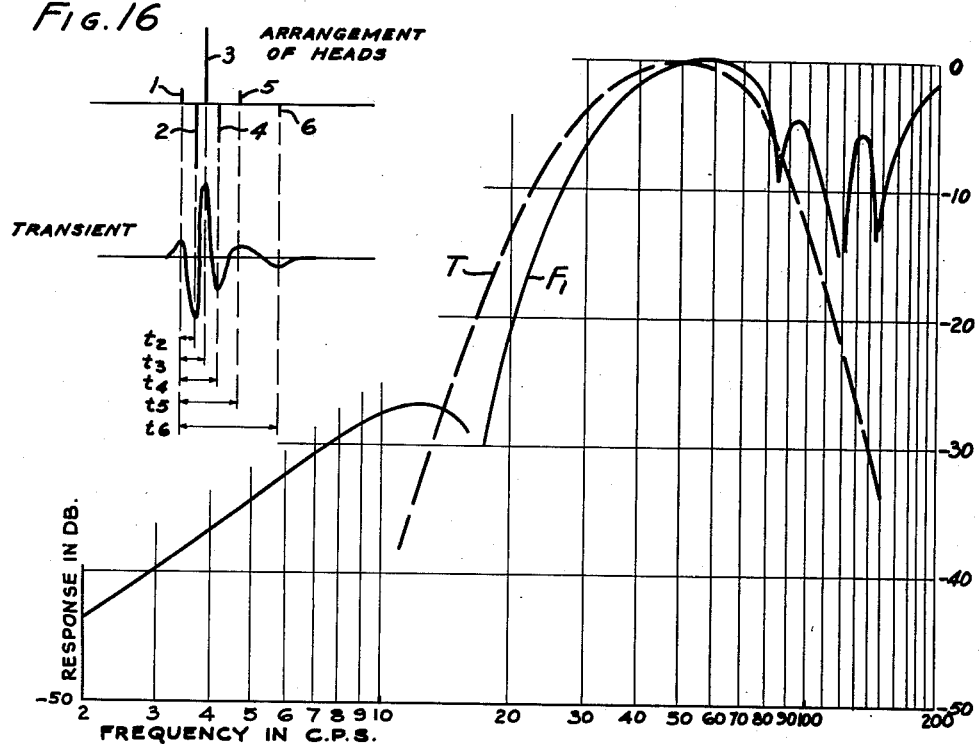
FIGS. 15, 16, 17, 18 and 19 show attenuation characteristics of systems according to this invention.

FIG. 1 shows schematically in single line diagram form a simple system of a well known type for detecting and recording random waves including desired transients propagated through a wave transmitting medium. It comprises a detector or pickup device 6 of the transducer type for receiving the random waves and translating them into corresponding electric waves. The received random waves may for example, be of the general type emanating from a disturbance in air, water or earth. Such waves travel in various directions through the medium and reflect or refract in a haphazard manner according to the presence and location of natural obstacles or phenomena, with the result that the waves reaching the detector are a random and complex composite of many waves both direct, refracted and reflected.

The electrical output of the detector is amplified in a suitable amplifier 7 in a well known manner and then carried to a recorder 8 where a record of the wave is made. Such an amplifier may be of a desirable type and may be provided with filters and an automatic volume control system, well known in the art. A common form of recorder useful for the purpose is the well known photographic type wherein a very light weight coil in a magnetic path receives the amplified output so that the coil oscillates in accordance with the electric waves. A very small mirror attached to the coil reflects a light beam 9 from a light source, casting a small spot of light on a strip 10 of sensitized photographic paper pulled in the direction of the arrows from a supply roller 11 and onto a rotating receiving roller 12. Such a system is the general type commonly used in seismographic recording systems.

The strip 10 bearing the record made by the equipment of FIG. 1 is illustrated in FIG. 2. This comprises a trace 13 in undulating form representing the composite of all the received waves. In the absence of any received waves, the photographic trace will be steady and aligned with the direction of movement of the paper strip, forming the straight line 14. At a point 15 the first impulse from the disturbance in the medium will be received and thereafter the waves representing the composite of the disturbance waves will be traced along the paper so long as the disturbance is received while the system of FIG. 1 is operated. Vertical lines 16 are commonly impressed on the photographic paper and these can conveniently be spaced a distance apart representing time intervals along the paper. For example, the lines can be spaced so that the distance between each line represents, for example, one-hundredth second at the speed at which the paper 10 is travelling past the light beam.

The foregoing described system and arrangement is well known notably in the seismographic work, particularly in prospecting for subsurface formations by the seismic wave method. The system is not necessarily limited, however, to seismographic operation, as it is applicable to wave propagation in other media than the earth.

From a record such as that of FIG. 2 information can be gleaned concerning the nature of a wave disturbance and its path of travel and materials or objects encountered or traversed by the waves. For example, in the range $t$ in FIG. 2, shown as having time range of a few hundredths seconds, if it be assumed that each vertical line 16 represents .01 second, there appears certain wave undulations and upon a close inspection it may be deduced that somewhere in that range $t$ a new wave has arrived which is of a different type or character from those waves which have previously arrived and which may also still be arriving in the same time range $t$. However, the precise place of arrival of the new wave on the record is difficult to ascertain and furthermore, its transient form is almost indistinguishable in view of the fact that it is obscured or masked by the random waves being received. In many records, such new arrivals may be so obscured by the masking waves that they can scarcely be ascertained. It would be very desirable to be able to select or filter out the initial transient of this newly arriving wave, as desirable information may be obtained from it. For example, in the case of seismographic work the newly arrived wave in region $t$ may be caused by a reflection of a wave front from the original disturbance from some particular subsurface formation as to which it is desired to have information. The precise time of arrival and the shape of the reflected wave may give such information. Ordinarily the first few cycles of such a transient are characterized by peaks of varying amplitude and varying time distances apart; that is, the frequency usually varies within a narrow range of, for example, 40 to 50 cycles per second.

In accordance with the present invention, there is provided a way of selecting such a transient from undesired waves which may be masking it. This is done according to a prefered embodiment of the present invention by making a reproducible record of the received random waves with the transient included, and then playing back the record with a filtering action such that only the relatively narrow frequency range occupied by the desired transient is passed, all other frequencies being substantially attenuated or cancelled.

FIGS. 3, 4, and 5 show an arrangement for doing this. This is like the system of FIG. 1 in having the detector 6 and amplifier 7; but instead of the recording device 8 making a permanent photographic record on the strip 10, there is substituted a record 17 which can be played back to make the permanent record. The recording medium 17 may be a suitable means which can be reproduced such as the well-known wax phonographic record, or a photographic film strip on which the record is placed in "sound track" form, such as the well-known variable density or variable area type; or it may be the magnetic wire or tape type on which the waves are recorded as varying increments of magnetic intensity. Of the various reproducible record means which are available, the magnetic tape form 17 is ordinarily preferred on account of its several mechanical advantages over other recording media. A great advantage of it resides in the fact that records made on it can be allowed to remain only temporarily. After making a record on it and playing it back, the record can be "wiped out" magnetically, in a well-known manner, so that the same tape is ready for a new record. Another advantage of the magnetic tape is that many records can be made side-by-side on one tape.

Such a tape is shown as an endless tape (FIG. 4) held on rolls 18 and 19 one or both of which may be used as drivers to drive the tape in the direction of the arrows. There is placed over the tape a suitable recording head 20 such as is commonly used in connection with magnetic wire or tape recording devices. Such a recording head is well known and comprises a magnetic member to which is related a coil on which is impressed the received and amplified electric waves; and the magnetic field of the core, varied in accordance with electric oscillations impressed on the coil, is placed in proximity to the tape travelling past it so that the successive elements of the tape passing beneath the head are subjected to the variations of magnetic flux along the line of travel of the tape. It will be understood of course, that when an endless tape is used the record should ordinarily be made within one complete revolution of the tape; for it will be apparent that any overlap of recording would have the effect of wiping out the part of the record overlapped.

FIG. 5 shows a top view of tape 17 containing the invisible magnetic record indicated by dotted line 21, made by recording head 20. For the purpose of playing back this record there are provided a plurality of pickup heads 22a, 22b, 22c, and 22d, each of which can be similar to recording head 20. These four heads are spaced apart from each other on the record by respective distances $d_1$, $d_2$, and $d_3$, so that head 22a first plays back a given increment of the record, followed by playback of the same increment at successive time intervals by the remaining heads 22b, 22c and 22d as determined by distances $d_1$, $d_2$ and $d_3$ and speed of record travel for the playback, which can be the same as the speed for recording. The outputs from the individual pickup heads are brought to respective amplifiers 23a, 23b, 23c and 23d, whose gains are separately adjustable, over separate electrical channels represented in single line diagram form as lines 24a, 24b, 24c and 24d; and each of these lines contains a respective polarity reversing switch 25a, 25b, 25c and 25d, so that the polarities of the pickup outputs arriving at the amplifiers can be changed relative to each other at will. The outputs of the amplifiers are combined at an impedance matching pad 26 (which may be a common arrangement of series and shunt resistances) where the signals are added algebraically and then carried over line 27 to recorder 8 which may be substantially similar to recorder 8 of FIG. 1. The photographic record made on photographic strip 10a will be a composite of the signals passed through the combining network.

Since the several pickups are spaced apart at different positions on the reproducible record of the waves received at detector 6, there is being recorded on the final record 10a at any instant, a single point resulting from increments of signal taken from different points along the reproducible record 17. Accordingly, the photographic record 28 (FIG. 6) on record 10a will look different from the record 13 made on the strip 10 by the system of FIG. 1. Furthermore, the record 28 made on strip 10a can be varied at will by the operator by changing the relative positions of the pickup heads 22a, 22b, 22c and 22d, and also by changing the relative polarities of their outputs and their respective amplitudes impressed on the combining network 26. The operator can, by manipulation of these three variable factors make different successive records such as 28 from the same intermediate record 17.

Assume now that it is desired to develop the newly arriving transient in region $t$ of FIG. 2, which will, of course, be present on the magnetic tape record 17, in magnetic form, if the detector 6 has put it on the magnetic tape 17, as in FIG. 3. It can be shown that the "best filter" for the separation of this transient from the masking waves is one whose frequency response has the same form as the frequency spectrum of the desired transient. (See "Extrapolation, Interpolation, and Smoothing of Stationary Time Series," by Norbert Wiener, published May 1950, jointly by the Technology Press of The Massachusetts Institute of Technology and John Wiley & Sons, Inc., New York, page 95). In the past, methods for effecting this separation have been inefficient. The requirements for a system which can accomplish these means are rigorous and consist in the following: The frequency response curve must be capable of being shifted uniformly and easily in the frequency spectrum, and the shape of the frequency response curve must be readily variable. It is a purpose of this invention to provide a system which is capable of approximating the desired frequency response and thereby separate the transient from the masking waves. The necessary flexibility in regard to the aforementioned requirements is provided in this system by the ease with which the playback heads can be moved relative to one another; the fact that the relative amplitudes of the playback signal can readily be varied; and the ability to reverse the polarities of the playback signals.

Reference is now made to FIG. 7, which is an enlarged view of the desired transient, without any of the undesired masking waves, on the magnetic tape within the time interval $t$. It is shown to have the four alternative positive and negative lobes, which are the first four lobes of the transient. These lobes, in general have different amplitudes, and the vertical lines $c_1$, $c_2$, $c_3$, and $c_4$ through the lobe centroids $c$ are of varying times apart, as shown by the different distances $d_1$, $d_2$ and $d_3$. The term "centroid," as used herein, means the point of the area within a lobe which is the center of gravity of that area. The abscissas of the centroid usually coincide nearly, but not necessarily exactly, with the abscissas of the peak amplitudes of the respective lobes. The different time intervals between the successive centroids, however, do not ordinarily vary greatly and may lie in a comparatively narrow range corresponding, for example, to a band width of 40 to 50 cycles per sec.

The remaining random waves which are masking this transient in the over-all reception as shown by the record of FIG. 2, ordinarily occupy many other and widely different frequencies so that the random waves may cover a range of, for example, 20 cycles per second to 2000 cycles per second. Because of this, there is ordinarily relatively little of the undesired random waves within the particular narrow frequency band of a desired transient. Accordingly, if this transient or band of frequencies can be selected with good discrimination, undesired masking waves can be attenuated. To do this, the operator after inspection of an initial record made directly as in FIG. 1 or else played back from the record of FIG. 5 can inspect the transient within the range $t$ and estimate approximate time distances between the successive centroids of the transient. In making such a record for inspection purposes, any filtering means associated with the amplifiers or otherwise included in the line or channel should be set to pass a relatively wide frequency band, wide enough to permit an undistorted view of the transient. Then by making an arbitrary setting of the four pickup heads of FIG. 5 in this time relationship, and reversing polarities of the outputs from the second and fourth heads, he can make a record on strip 10a which will tend to develop the transient.

I have found that one simple method of setting the variables associated with playback heads in the time scale, which provides approximately the desired results in the frequency scale, consists of the following steps:

(1) The playback heads are spaced apart by time distances substantially equal to the time distances on the tape record of the successive centroids.

(2) The amplification factors of the amplifiers of the respective playback heads are set substantially in proportion to the areas enclosed within the respective lobes of the transient.

(3) The polarities of the pickup heads are made to correspond to the polarities of the respective lobes.

The spacings between adjacent playback heads can be changed at will, as by manipulation of handle means 70a, 70b, 70c and 70d (FIGS. 5 and 10) attached to the respective heads. Furthermore, the relative polarities of any of the several heads may be changed as desired. Moreover, it will be understood that the relative amplitude of signal response from each head to be combined with each other may be varied at will.

In general, the arrangement of the plural pickup heads amounts to a wave filter, a portion of whose attenuation characteristic is shown in generalized form in FIG. 8 which is a plot of attenuation vs. freqeuncy. This shows that there is a frequency pass band of relatively low attenuation.

The arrangement of the several pickup heads on a single magnetic record on the tape, as shown in FIG. 5, is not always the best way of carrying out the invention, particularly where a magnetic tape is used for the reproducible record. The reason for this resides in space consideration. The ordinary physical size of a head such as 22a—22d is such that the distance on the tape representing a given time interval such as .01 second, would usually have to be undesirably large in order for the heads to resolve the wave form. Usually such a time interval is represented by a linear length of the order of only about ⅛ inch on the record; and such a small dimension cannot accommodate an ordinary head. For this reason it will ordinarily be desirable to split the magnetic record 21 of FIG. 5 into several identical records 21a, 21b, 21c and 21d as shown by the dotted lines in FIG. 9, the number of these separate magnetic records being as great as the number of the pickup heads. The separated magnetic records are made by dividing the output of amplifier 7 into the four parallel channels, which are brought to separate recording heads 20a, 20b, 20c and 20d placed at spaced lateral distances across the tape 17 as shown in FIG. 9. Furthermore, the four heads may be staggered one behind the other in the longitudinal direction of movement of the tape, as shown, so that one will start at a position $S_a$, the second at a position $S_b$, the third at a position $S_c$ and the fourth at a position $S_d$; and the distances S between adjacent starting points in the longitudinal direction of movement of the tape will ordinarily be the same between adjacent starting points. Since the four recording heads are all electrically in parallel the four magnetic records will be identical but displaced in longitudinal distance from each other by the distance S. It will be understood, of course, that the several distances S could be made unequal if desired, without affecting the operation.

In order to play back the records 21a, 21b, 21c and 21d with the same displacements $d_1$, $d_2$ and $d_3$ as is shown in FIG. 5, the four playback heads 22a, 22b, 22c and 22d will be spaced on tape 17 in the manner shown in FIG. 10; otherwise, the playback system comprising the reversing switches, amplifiers, combining network and recorder (not shown in FIG. 10) can be the same as that shown in FIG. 5. In FIG. 10, the spacings between adjacent playback heads in the direction of movement of the record, instead of being $d_1$, $d_2$ and $d_3$ as in FIG. 5, will be $S+d_1$, $S+d_2$, and $S+d_3$, respectively. This arrangement will produce the same record 28 on photographic strip 10a as is shown in FIG. 6.

FIG. 11 illustrates a system in which an oscillator-modulator is used so that the undulations which are recorded on the tape are the frequency of the oscillator modulated by the signals picked up from the detector. The system is shown in an arrangement analogous to that of FIGS. 9 and 10 in that provision is made for separating the signals from the detector into four separate traces on the tape (the tape not being shown in FIG. 11). The output of the amplifier 7 is brought to a modulator-oscillator 30, and the output of the oscillator-modulator is divided into four parallel channels leading into the respective recording heads 20a, 20b, 20c and 20d, as in FIG. 10.

The oscillator-modulator is preferably of the frequency-modulated type although it will be understood some other form of modulation could be used such as the well known amplitude modulation, phase modulation, phase width ratio modulation, pulse code modulation, repetition rate modulation. The mean frequency of the oscillator can conveniently be about 5000 cycles per second, and the system can conveniently be designed so that when frequency-modulated by the output of the detector through amplifier 7, the frequency will swing in a range of about 3000 to about 7000 cycles per second. Such an oscillator-modulator arrangement is well known and needs no further description here.

It will be understood, of course, that the oscillator-modulator arrangement of FIG. 11 could as well be applied to the more fundamental arrangement of FIGS. 3 to 5.

The traces made on the magnetic tape record by the heads, will then be the same as the traces made on record 17 of FIG. 9 except that the undulations instead of representing the frequencies and amplitude of the detector output will be the modulated oscillator frequency.

For playing back such signals there can be used the playback heads 22a, 22b, 22c and 22d, similar to the same numbered heads in FIG. 10 and similarly placed. The outputs of the playback heads will be brought to individual demodulators 31a, 31b, 31c and 31d which will serve to demodulate the signals picked up and thus produce in their outputs, signals which correspond with the signals picked up at the detector 6; modified, of course, by the action of circuit elements such as filters, amplifier characteristics or automatic volume controls associated with amplifiers. The outputs of the demodulators are brought to respective potentiometers 32a, 32b, 32c and 32d which can pass on to the reversing switches 25a, to 25d as much of the demodulated signal as it is desired to impress on the adding or combining network 33. In this way the potentiometers have the effect of adjusting for the relative amplitudes of the respective traces which are impressed on the recorder 8.

A particular arrangement of the potentiometers, reversing switches and combining network 33 may be as shown in FIG. 12, wherein the elements within the dot-dash rectangle 45 are specific forms of the apparatus shown within the same numbered rectangle in FIG. 11. The respective leads 46, 47, 48 and 49 from the respective demodulators are brought to the respective potentiometers 32a, 32b, 32c and 32d through suitable isolating condensers 63a, 63b, 63c and 63d as shown; and adjustable taps 51a, 51b, 51c and 51d from the respective potentiometers are brought to the control grids 52a, 52b, 52c and 52d of respective vacuum tubes 53a, 53b, 53c and 53d.

The cathodes 54a, 53b, 54c and 54d of the tubes are connected to contacts 55a, 55b, 55c and 55d of the respective reversing switches 25a, 25b, 25c and 25d. The other contacts 56a, 56b, 56c and 56d of the reversing switches are connected with the respective anodes 57a, 57b, 57c and 57d. The anodes are all supplied with a source of positive voltage indicated as +B, this voltage being supplied through respective resistors 58a, 58b, 58c and 58d; and each cathode is connected to ground through a grid biassing resistor, these being numbered 59a, 59b, 59c and 59d, respectively.

This arrangement of the vacuum tubes is well known and is commonly called a phase splitter or inverter. With this arrangement, each cathode is 180° out of phase with the anode of the same tube. The result is that when a selected intensity or amplitude of signal voltage is taken from the respective potentiometer and applied to the control grid of the tube, the phases or polarities at the respective switch points such as 55a and 56a of a switch are opposite to each other; and thus the polarity can be selected by turning the switch arm such as 25a to the desired one of its two contacts.

The equipment of the adding network within rectangle 33 comprises vacuum tubes 60a, 60b, 60c and 60d which receive the outputs from the respective reversing switches, these reversing switch outputs being connected to the control grids of the tubes of the adding or combining network through suitable isolating condensers and with potentiometer type grid-leak resistors between control grid and ground, as shown; so that adjustment of the individual potentiometers can trim the gains of the individual tubes 60a to 60d to make them all alike. The cathodes have the usual resistors in series between ground to develop grid bias in a conventional manner. The outputs at the anodes are joined together and thus added, the total signal being carried through a condenser 61 to line 50 which supplies the recorder. Positive voltage for the anodes of these tubes is supplied from the source +B through a resistor 62.

It is entirely possible to use the same heads for both recording and playback, in all embodiments of the invention. Such an arrangement is shown in FIG. 13 wherein recording heads 20a to 20d and the playback 22a to 22d within dotted rectangle 34 are shown replaced by the elements within dotted rectangle 34a of FIG. 13. In FIG. 13, selecting switches 35a, 35b, 35c and 35d are associated with respective heads 20a, 20b, 20c and 20d so that when the switch is turned to the dotted line position, the heads are connected to output channel 36 from the oscillator-modulator 30 (FIG. 11). When turned to the full-line positions, however, the switches connect the heads through respective channels 37a, 37b, 37c and 37d leading to the respective demodulators. Such an arrangement avoids need for a set of playback heads separate from a set of recording heads.

An arrangement which may prove very desirable for seismic prospecting work wherein it is customary to use a number of detectors at spaced points on the ground to receive impulses from a single explosion, is that shown in FIG. 14. There, the magnetic heads are arranged in four blocks A, B, C and D, shown in staggered relationship across the magnetic tape 38, on account of space considerations. In the arrangement of FIG. 14, it is assumed that there are six detectors such as detectors 6 of FIGS. 3, 9 or 11, and that the line from the output of each detector is divided into four parallel channels resulting in the four recording heads 20a, 20b, 20c and 20d as in FIGS. 9 and 11. Each of these recording heads 20a, 20b, 20c and 20d is given a fixed position in an individual one of the blocks A, B, C, and D of FIG. 14. Similarly, a second of the six detectors will have its output divided into four parallel channels leading to the respective recording heads 40a, 40b, 40c and 40d which are each given a fixed position in the respective blocks A, B, C, and D of FIG. 14. In similar fashion the third of the detectors will have respective recording heads 41a, 41b, 41c and 41d, each given a fixed position in the respective blocks A, B, C, and D. Thus, each of the four blocks can be provided with as many recording heads as corresponds to the number of detectors used, there being six recording heads, corresponding to six detectors D, in the arrangement of FIG. 14. The number of blocks will correspond with the number of channels into which each detector output is divided, this number being four in the present example.

The heads in the blocks A, B, C, and D can be arranged for playback as well as for recording by using the switching system such as that shown in FIG. 13.

For making the records on the tape the four blocks A, B, C and D will be given desired longitudinal positions on the tape which will be positions of convenience. Since the blocks are not moved laterally across the tape, no adjustments are possible in that direction. For playback, the several blocks will then be moved relative to each other from positions of recording, as has been explained above in order to produce the $S+d_1$, $S+d_2$ and $S+d_3$ relationships shown in FIG. 10. The arrangement is similar to those of FIGS. 9 to 11 except that the heads of a plurality of detectors are moved in unison.

Means for moving blocks B, C and D relative to each other and to block A are shown in the form of threaded screws 71b, 71c and 71d threaded through threaded apertures in fixed members 72b, 72c and 72d, respectively. The ends of the screws have suitable flanges 73b, 73c and 73d fitted into respective sockets of members 74b, 74c and 74d attached to the respective blocks. By these means, turning of any of the screws in one direction or the other moves the respective block in the corresponding longitudinal direction. Since it is unnecessary to move block A this is shown in fixed position.

The systems involving the use of plural pickup heads spaced apart on a record by time distances are in effect wave filters whose frequency discriminating characteristics are dependent on factors of time spacing of the several playback heads, relative amplitudes of the playback signal at the combining network, and the relative polarities of the signals received from the playback heads at the combining network.

The great utility of this method of wave filtering lies in the flexibility of the system. It will be shown that many widely varying types of frequency response curves may be obtained by simple manipulation of the variables associated with the playback heads.

Figure 15:
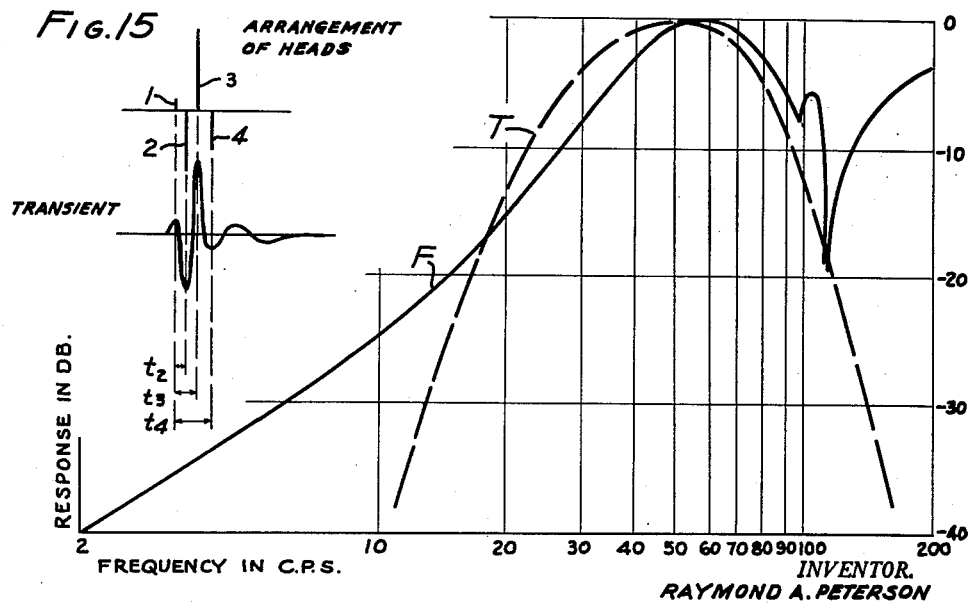

An example of the ease with which the frequency spectrum of a transient may be approximated is given in FIGS. 15 and 16.

FIG. 15, for example, illustrates the frequency spectrum of a typical transient represented adjacent the graph, and also the frequency response of the composite of four heads 1, 2, 3 and 4, also represented adjacent the graph. In this head representation the lines 1, 2, 3 and 4 represent the outputs of the respective heads on playback as received at the adding or combining network, for example, the outputs from the four heads 20a, 20b, 20c and 20d respectively of FIGS. 13 or 14. Those lines extending upwardly from the horizontal base line represent a positive polarity; and those lines extending downwardly from the base represent a reversed or negative polarity. The lengths of the lines indicate relative amplification associated with the respective heads, these relative amplitudes being herein referred to as $a_1$, $a_2$, $a_3$ and $a_4$, respectively. In this example, the values of these $a$'s have been set proportional to the areas enclosed within the respective lobes of the transient. For example, $a_1$ is proportional to the area enclosed by the lobe corresponding to head 1; $a_2$ is proportional to the area enclosed by the lobe corresponding to head 2, etc. The time distances apart of the lines 1, 2, 3 and 4 represent head spacings, these being the same as the spacings between centroid lines of adjacent lobes of the transient. The time spacings of the successive heads from the first head are indicated on the graph as $t_2$, $t_3$ and $t_4$, respectively.

In the example for which the graph is given, the values of the time spacings and relative amplitudes producing the graph are:

| | |
|---|---|
| $a_1 = 26.6$ | $t_2 = 7.23$ milliseconds |
| $a_2 = 118.2$ | $t_3 = 14.47$ milliseconds |
| $a_3 = 151.3$ | $t_4 = 25$ milliseconds |
| $a_4 = 70.6$ | |

The curve T illustrates the frequency spectrum of the transient. The curve F illustrates the frequency response of the four heads as a filter. It is observed that in the frequency response region of the transient, the static filter characteristic of curve F closely coincides with the spectrum of the transient.

The higher frequency portions of the frequency response curve F may be readily removed by the use of well-known external filters, thus increasing the similarity between the two curves F and T. A similar type of external filtering can be applied at the lower frequencies, again increasing the degree of accuracy with which the response curve F duplicates the transient spectrum T. Such filtering means can be inserted, if desired, into line 50 at the position shown by the dotted rectangle 80 in FIG. 11.

I have found that a criterion for selection of the transient is this close correspondence of the filter response and the transient spectrum; and when there is close coincidence of the two, the filtering action of the four heads will effectively select and develop the transient.

An even closer approach to coincidence between the transient spectrum and filter characteristic can be had by increasing the number of heads. This is illustrated by the graph of FIG. 16 wherein six heads are used instead of four for developing the same transient as in FIG. 15. The first four heads of FIG. 16 have the same $a$ values and $t$ values as in FIG. 15. The additional heads 5 and 6 have the values $a_5 = 22.6$, $a_6 = 11.7$, $t_5 = 43.4$ and $t_6 = 61.84$. The curve $F_1$ representing the static filter characteristic coincides with the transient spectrum T even more closely than does the filter curve F in FIG. 15.

The response or amplitude $Am$ of the six-headed playsystem, plotted as curve $F_1$ in FIG. 16 is given in db by:

$$Am = 10 \log \{(a_1 - a_2 \cos \omega t_2 + a_3 \cos \omega t_3 - a_4 \cos \omega t_4 + a_5 \cos \omega t_5 - a_6 \cos \omega t_6)^2 + (a_2 \sin \omega t_2 - a_3 \sin \omega t_3 + a_4 \sin \omega t_4 - a_5 \sin \omega t_5 + a_6 \sin \omega t_6)^2\}$$

where $$\omega = 2\pi f$$

Again it is possible by simple external filtering means, for example at position 80 of FIG. 11, to make the lower frequency and higher frequency portions of the frequency response curve approximate closely the same respective portions of the frequency spectrum curve T.

It can be seen from these specific examples that the system proposed in this invention approximates very nearly the so-called "best filter," as previously described. The degree of approximation can be improved by increasing the number of playback heads. It has been found, however, that the approximation is very poor if the number of playback heads is less than three. In other words, to effectively separate the desired transient from the masking waves, it has been found impractical to use less than four playback heads, one for each of four lobes; and certainly there should never be less than three heads.

Figure 17:
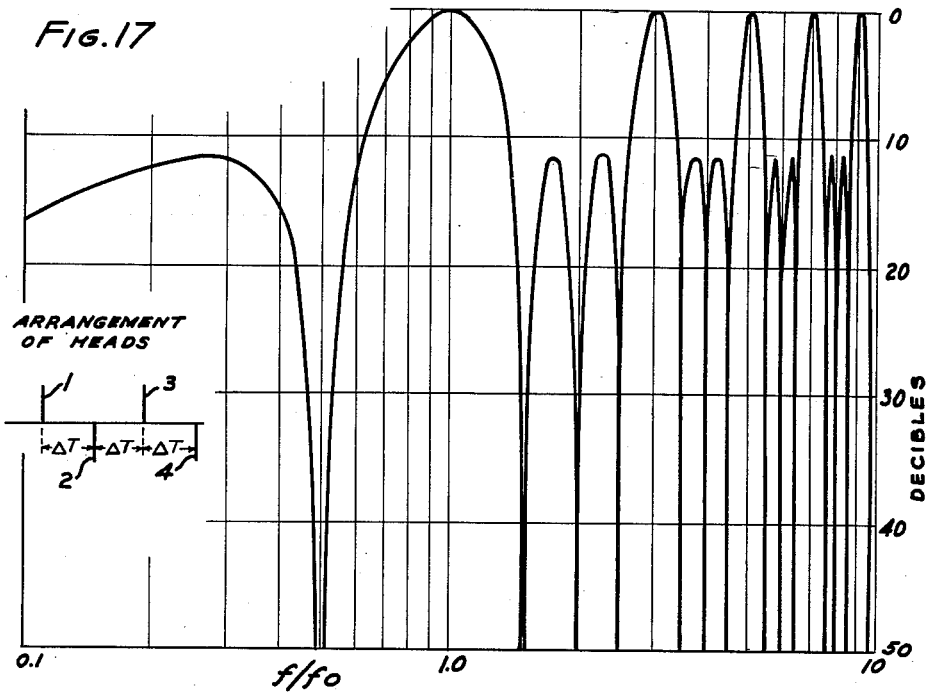
Figure 18:
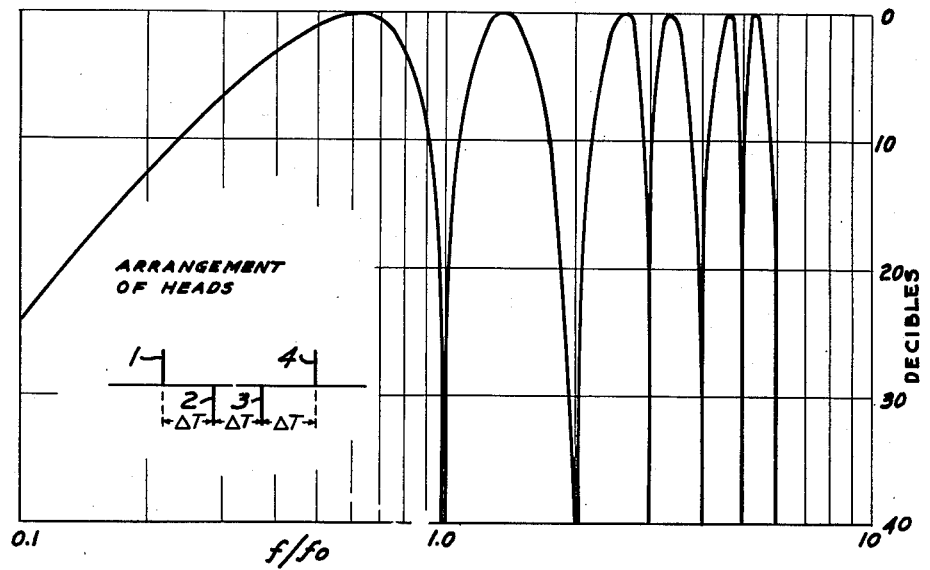
Figure 19:
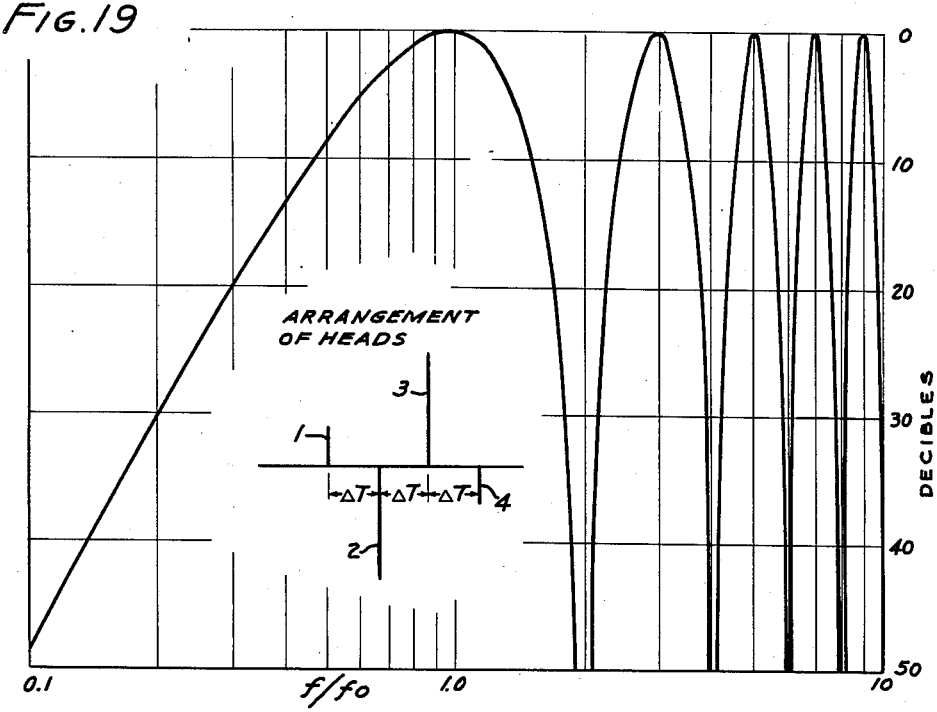

In the arrangements of FIGS. 15 and 16, the time spacings between each two adjacent heads are unequal. FIGS. 17, 18 and 19 illustrate attenuation characteristics by use of four playback heads on a record with an equal spacing $\Delta T$ between each adjacent two of the four playback heads. In the head arrangement of FIG. 17, the second and fourth heads have their playback signals reversed in polarity, while the first and third heads have the positive polarity. Moreover, the playbacks from all heads are impressed on the combining network in the same relative amplitude; that is, the gain or the proportion of the playback voltage selected at each potentiometer is the same.

With this particular arrangement the amplitude of the signal sent to the recorder is expressed as:

$$\text{Ampl.} = 4 \cos (2\pi f \Delta T) \sin (\pi f \Delta T)$$
$$= 4 \sin \left(\frac{\pi}{2} \frac{f}{f_0}\right) \cos \left(\pi \frac{f}{f_0}\right)$$

where

Ampl. = amplitude (voltage output to the recorder)
$\Delta T$ = time interval between adjacent heads
$f$ = frequency $$f_0 = \frac{1}{2\Delta T}$$

The graph shows the attenuation in decibels plotted against $$\frac{f}{f_0}$$

and is actually a plot of $$20 \log \left[ 4 \sin\left(\frac{\pi}{2}\frac{f}{f_0}\right) \cos \left(\pi \frac{f}{f_0}\right)\right] \text{ versus } \frac{f}{f_0}$$

normalized to the condition of:

$$0 \text{ decibels} = 20 \log 4$$

The graph of FIG. 17 shows that there are nulls or maximum attenuations at $$\frac{f}{f_0} = .5$$

and also 1.5, with a transmission band between them, the minimum attenuation being at $$\frac{f}{f_0} = 1.0$$

In addition there are other higher frequency pass bands centered at $$\frac{f}{f_0} = 3, 5, 7, 9, \text{ etc.}$$

Ordinarily, the pass band centered at $$\frac{f}{f_0} = 1$$

will be used; although other of the pass bands could be used instead if desired. Furthermore, any of the unused pass bands can be filtered out, if desired, by well-known filtering means.

FIG. 18 shows the change in the attenuation characteristic produced by reversing the relative polarities of playback heads at 3 and 4 from what they were for FIG. 17 while leaving the spacings $\Delta T$ the same. Under this condition, the pass bands have moved to different positions in the frequency spectrum, the nulls being located at $$\frac{f}{f_0} = 1, 2, 3, 4, \text{ etc.}$$

with pass bands between the adjacent null points.

In the particular arrangement of FIG. 18, the amplitude of the signal sent to the recorder is expressed as $$\text{Ampl.} = 8 \sin^2 (\pi f \Delta T) \cos (\pi f \Delta T)$$
$$= 4 \sin \left(\pi \frac{f}{f_0}\right) \sin \left(\frac{\pi}{2} \frac{f}{f_0}\right)$$

The graph shows the attenuation in decibels plotted against $$\frac{f}{f_0}$$

and is an actual plot of $$20 \log \left[ 4 \sin \left(\pi \frac{f}{f_0}\right) \sin \left(\frac{\pi}{2} \frac{f}{f_0}\right)\right] \text{ versus } \frac{f}{f_0}$$

normalized to the condition of $$0 \text{ decibels} = 20 \log 3.08$$

FIG. 19 shows the attenuation characteristic produced by leaving the spacing $\Delta T$ the same as for the condition of FIGS. 17 and 18, and also leaving the relative polarities the same as for FIG. 17, but increasing the amplitudes of the signal from the second and third heads to three times that of the first and fourth heads. Under this circumstance, nulls occur at $$\frac{f}{f_0} = 2, 4, 6, 8, 10, \text{ etc.}$$

with pass bands between them. Under this condition the amplitude of the signal sent to the recorder is expressed as $$\text{Ampl.} = 8 \sin^3 (\pi f \Delta T)$$
$$= 8 \sin^3 \left(\frac{\pi}{2} \frac{f}{f_0}\right)$$

and the graph is a plot of $$20 \log \left[ 8 \sin^3 \left(\frac{\pi}{2} \frac{f}{f_0}\right) \right] \text{ versus } \frac{f}{f_0}$$

normalized to the condition of $$0 \text{ decibels} = 20 \log 8$$

It will be observed that the pass bands are wider than in FIG. 17.

From the foregoing attenuation characteristics of FIGS. 15 to 19 it is observed that changing either the relative amplitudes or the relative polarities of the playback heads changes the pass band width as well as the position in the frequency spectrum. Furthermore, an inspection of the formulae shows that changing the $\Delta T$ also has the effect of changing the pass band width and the position of the pass band in the frequency spectrum.

Although the invention has been particularly illustrated and described by reference to the use of four playback heads in the block, it will be understood that a greater number of heads can be used if desired, and with the possibility of improved results. It has been found impractical to use less than four playback heads because less than this number does not properly bring out the shape of the wave transient. For some purposes it may be possible to show a part of the transient by the use of as few heads as three; although such a small number of heads is not recommended for effective filtering.

Furthermore, although wide latitude is permissible in the selection of relative polarities of the different playback heads in the group at least some diversity of polarity among the several heads of the group is ordinarily indicated for effective transient development.

Figure 20:
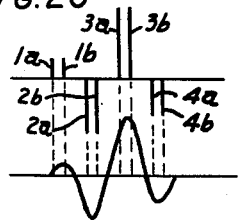
FIG. 20 shows schematically an arrangement of magnetic heads in accordance with the invention.

It should be noted that the particular arrangement of playback heads described in the above examples can be modified or refined if desired. In the examples given above, there is shown the use of only one playback head for each lobe of a transient. It should be understood, however, that more than one head may be used to represent each lobe. FIG. 20, for example, shows a schematic arrangement of heads using two heads for each lobe. The heads 1a and 1b perform the work of head 1 in FIG. 15. Similarly the heads 2a and 2b perform the work of head 2 and so on.

Figure 21:
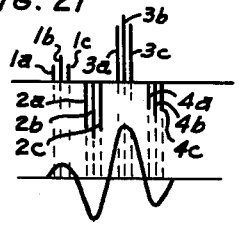
FIG. 21 shows another arrangement of magnetic heads according to the invention.

FIG. 21 shows a further refined arrangement in which three heads per lobe are used. Thus, heads 1a, 1b and 1c do the work for the first lobe; heads 2a, 2b and 2c do the work for the second lobe, and so on.

It will be understood that in arrangements of multiple heads per lobe as illustrated in FIGS. 20 and 21, the sum of the relative amplifications of all the heads of the group for a lobe should be about proportional to the lobe area, just as though a single head per lobe were being used. Thus, the total relative amplification of heads 1a and 1b in FIG. 20 should add up to that of head 1 in FIG. 15. Similarly the total amplification of heads 1a, 1b and 1c in FIG. 21 will add up to that of head 1 in FIG. 15. A similar relationship will apply to the other heads in FIGS. 20 and 21.

In respect to the relative displacements of the heads on playback, the midheads of the lobe groups should be located to coincide approximately with the centroids of the respective lobes; that is, in the positions of the heads in FIG. 15. Thus, heads 1b, 2b, 3b and 4b of FIG. 21 will be displaced from each other about in the relative positions of heads 1, 2, 3 and 4, respectively, in FIG. 15. In the case of an even number of heads per lobe, as in FIG. 20, the heads for a lobe will ordinarily be evenly divided on either side of the centroid. In all cases all the heads of a lobe group will be located to lie within the base of the corresponding lobe.

It will be recognized that by the present invention there is provided a readily usable way of developing a transient wave from among random waves, in such a way that the features of the transient can readily be recognized, including the shape, amplitude and time spacing of its adjacent peaks. In this way, much information is ascertainable about the wave, including the means or manner of its reflection or refraction or diffraction from objects and the location and form and characteristic of the object. The invention in particular provides an easily operable way of selecting the relatively narrow frequency range and the component peaks of the transient which factor may vary considerably.

It will be understood that variations may be made from the embodiments specifically disclosed, all within the scope of the invention; and in the embodiments illustrated and described are given by way of illustration rather than of limitation.

The particular manner of moving the playback heads relative to each other along the direction of motion of the record may be selected at will.

Furthermore, the manner of changing the relative amplitude or gain of the individual playback signals can be modified or selected as desired.

Other means than a magnetic tape may be used for the reproducible record; and if the record material be changed, it will be understood, of course, that the recording and playback heads will correspondingly be changed from the magnetic heads to elements which are appropriate for the reproducible record material which is being used.

Figure 22:
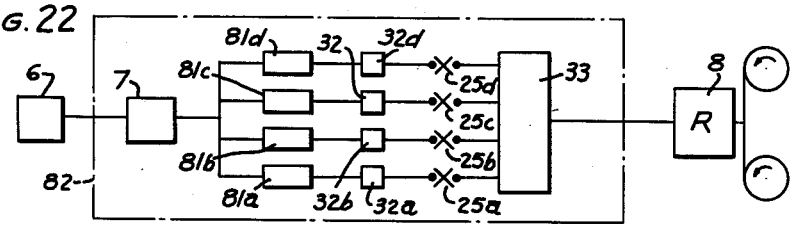
FIG. 22 shows in block diagram form a further system in accordance with the invention.

As has been noted heretofore, it is possible to develop the transient without the use of a magnetic tape or other form of recording medium for making a temporary record. The requisite division of the signal from a detector into several channels with attendant time delays for the respective channels, and amplification and polarity selections can be made in other ways. One such way is illustrated in FIG. 22 wherein the output of the amplifier 7 from detector 6 is divided into four channels in a manner similar to that of FIG. 11. But instead of including the magnetic tape recording heads 20a, 20b, 20c and 20d in the respective channels, as in FIG. 11, there are instead used time delay devices 81a, 81b, 81c and 81d in the respective four channels, the time delays of which may be made adjustable. No magnetic tape or other temporary recording medium need be used. Ordinarily all the channels will be provided with the time delay means, although in some cases the time delay device may be omitted or made non-adjustable in one of the channels. The relative amplitudes or gains at the four channels can be adjusted by adjustable potentiometers 32a, 32b, 32c and 32d, similar to the same numbered potentiometers of FIG. 11. The polarity reversing switches 25a, 25b, 25c and 25d may be similar to those of FIG. 11, and likewise the adding network 33 may be like that of FIG. 11.

Types of time delay producing device 81a to 81d, other than magnetic tape or other recording media, which may be used, are well known. For example, there can be used mercury delay lines, artificial transmission lines, acostic delay producing devices, electric delay networks and the like.

Another expedient which may be useful with systems according to the present invention resides in the possibility of combining the outputs of several channels of information. For example, the outputs of two or more detectors can be combined. Such an arrangement is illustrated schematically in FIG. 23 wherein there are shown two detectors $6a$ and $6b$ in place of the detector 6 of FIG. 22. The output of detector $6a$ leads to elements within the dotted rectangle $82a$, which elements can be the same as those within the dotted rectangle 82 of FIG. 22. The output of deflector $6b$ is carried to elements within the dotted rectangle $82b$ which elements can similarly be the same as those within the dotted rectangle 82 of FIG. 22. The outputs of the elements in dotted rectangles $82a$ and $82b$, instead of being led directly to the recording equipment 8 as in FIG. 22 are brought to a combining or adding network 83, the output of which is then carried to the recorder 8. It will be understood that any number of detectors such as $6a$ and $6b$ can be combined in an arrangement like that of FIG. 23 with their outputs brought to the network 83 for combination with the outputs from the other detectors.

Figure 23:
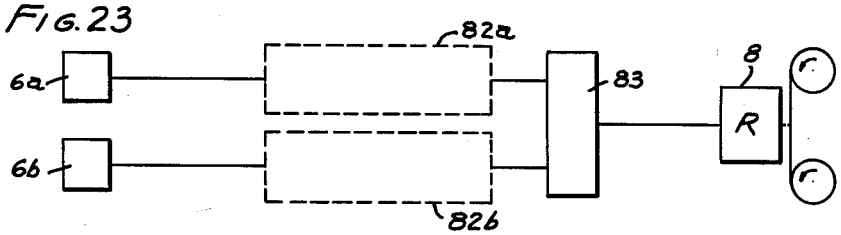
FIG. 23 shows in block diagram form another system according to the invention.

It will also be understood that in seismic operations appropriate time delays may be incorporated into the apparatus represented by rectangles $82a$ and $82b$ in FIG. 23, as corrections for weathering time delays and "normal move-out" time delays due to the distance of separation of each detector from the shot point. It should further be noted that in an arrangement such as that shown in FIG. 14, individual heads in blocks A, B, C and D may be individually adjusted relative to the described block displacement, to correct for such weathering and "normal move-out" time delays.

The arrangement of FIG. 23 in effect combines wave information derived from different space and different time relationships. Thus, the several detectors such a $6a$ and $6b$ can be arranged in different positions in space, for example, at different positions along the ground in the case of seismic wave reception. Since the outputs from each individual detector are then divided into the several channels such as the four channels of FIG. 22 (or any other desired number of channels) and with the channels varied from each other in time by the time delaying means, there are thus produced the differences of time. By such a composite arrangement it is possible to develop much information in regard to transients which may otherwise be hard to obtain.

It will be understood, of course, that an arrangement such as that of FIG. 23 is applicable to the use of recording media such as magnetic tape, as to any other type of equipment capable of producing relative time differences.

It should be understood that the final record which is made to show the developed wave or transient need not necessarily be a photographic record, such as the record $10a$ of FIGS. 5, 11, 22 and 23. Some other suitable recording medium might be used instead, if desired. It is possible, for example, to substitute an oscilloscope for the recorder 8, in which case the wave would be displayed only while the oscilloscope is turned on. It will be understood that the term "record" as used in this specification and in the claims to refer to the ultimate record of the selected wave or transient, denotes any such means for recording or displaying the wave.

It should be understood that the terms "waves," "masking waves," "wave transient" and the like, and their transmission and recording through channels or on records, as used in the appended claims, cover not only the waves in their original detected form, but also in their modified forms when modified by the presence of means such as described hereinabove as exist, for example, when they are subjected to amplification, filtering, time delay, phase shift or polarity reversal, or modulation and demodulation, or the like. Thus, the terms "waves" and "wave transient" include wave information resulting from the modulation and demodulation produced by the waves or transient. All such modifications of waves, as well as the original waves themselves, are encompassed in the expressions "wave information" or "signals."

It has been shown hereinabove (see FIGS. 9 to 11) that a convenient way to scan a magnetic track at a series of displaced positions and derive outputs of varying time differences which may then be added, is to record the same signal information, for example from a detector or geophone, on a plurality of separate magnetic channels in parallel. Then in playing back, the pickups or magnetic heads were displaced by differential times (see FIG. 10) and the several outputs were then added to produce the filtering effect. This procedure, of course, results in increasing the amount of area required on a tape, by a factor which is equal to the number of channels into which a signal is divided.

In seismic operations it is a common practice to record the outputs from a considerable number of differently located geophones or groups of geophones on one record or tape. Consequently when each such record from a geophone or group of geophones is divided into several parallel tracks (four such parallel tracks being shown in FIGS. 9 and 10) the number of useful different seismic channels which can be recorded on one tape is reduced by this factor (which is a factor of four in the case of FIGS. 9 and 10).

The disadvantage of dividing each geophone output into a plurality of parallel tracks can be avoided, at least in field operations, by simply recording each geophone output only once, that is, on only one track in the original record made in the field. This will result in a plurality of different magnetic tracks on the tape, side by side, there being one such track for each geophone.

To practice the operation of the present invention from such an initial record, each original track can then be re-recorded on a separate tape at some later convenient time; and in the re-recording process, the initial track can be divided into as many parallel tracks as may be desired. Such an arrangement is shown in FIG. 24 wherein a number of geophones $G_1$, $G_2$, $G_3$, $G_4$, $G_5$ and $G_6$ are shown at spaced positions on the ground. Although six geophones are shown, it will be understood that any other number can be used and in usual practice a considerably greater number of geophones is used at one time. The geophone outputs are carried through respective amplifiers $A_1$, $A_2$, $A_3$, $A_4$, $A_5$ and $A_6$ to respective recording heads $H_1$, $H_2$, $H_3$, $H_4$, $H_5$, and $H_6$, located at spaced positions across the magnetic tape $17a$. These heads are shown arranged adjacent to each other because it is assumed that there is enough space available on the tape to place them adjacent. It will be understood, however, that if desired, the heads could be staggered in the manner shown in FIG. 9; or they could be staggered in some other known manner, for example by having one group of recording heads aligned with each other and then having another group of which the heads are aligned, the second group being stagered relative to the first group. In such an arragement the traces made by the second group will ordinarily be interleaved on the tape between the traces made by the first group of heads. In this arrangement the tracks $T_1$, $T_2$, $T_3$, $T_4$, $T_5$ and $T_6$ will contain information from the respective geophones $G_1$, $G_2$, $G_3$, $G_4$, $G_5$ and $G_6$.

Regardless of the particular method employed to record the original geophone signals on the tape $17a$, each separate geophone record may then be divided into a plurality of separate tracks as shown in FIG. 25; and this may be done by playing back, by playback heads $P_1$, $P_2$, $P_3$, $P_4$, $P_5$ and $P_6$, the individual tracks of tape $17a$ onto another tape 17. In FIG. 25 only one of the tracks $T_4$ is shown being played back, this being played back by the playback head $P_4$, which operates through an amplifier 150, the output of which is divided into four channels leading into the respective recording heads $20a$, $20b$, $20c$ and $20d$ onto the tape 17. The amplifier 150 is of the type which amplifies the played-back signals to a power level suitable for driving the record heads 20 to re-record a corresponding series of tracks on the new tape 17. This amplifier need not incorporate any demodulation circuits whatsoever. For example, if the geophone signals are recorded in FM form on the tape $17a$, then the signals picked up by the playback heads $P_1$–$P_6$ are also in FM form. In this case the amplifier 150 merely raises the power level of the played-back FM signals and re-records corresponding FM signals on new parallel sets of tracks on tape 17. In such case, the amplifier 150 may also include "peak-clipping" and limiting devices to "re-shape" the individual cycles for re-recording purposes. The recording heads and tape 17 correspond to the same numbered elements in FIG. 9. Although the playback heads $P_1$, $P_2$, $P_3$, $P_4$, $P_5$ and $P_6$ for the separate tracks on tape $17a$ are shown as different elements from the original recording heads $H_1$, $H_2$, $H_3$, $H_4$, $H_5$ and $H_6$, it will be understood that the same heads may be used to play back as are used for recording, subject to the use of the required switching arrangements as described hereinbefore.

Each of the other pickup heads on tape $17a$ can be used for re-recording into a plurality of channels in the same way as shown in FIG. 25. If desired, the plurality of channels of all the playback heads $P_1$ to $P_6$ may be placed on a single tape such as 17, subject to space limitations, or they may be placed on separate tapes as may be desired.

FIG. 26 shows a re-recording arrangement which may be used alternatively to that used in FIG. 25. In FIG. 26, the tape $17a$ is assumed to be the same as the same numbered tape in FIG. 24, containing original signal information from separate geophones or detectors; and the playback heads $P_1$ to $P_6$ correspond to the same numbered heads in FIG. 25. In FIG. 26 each playback head is carried through a respective amplifier $a$, $b$, $c$, $d$, $e$ and $f$, and then to respective recording heads $90a$, $90b$, $90c$, $90d$, $90e$ and $90f$ arranged in spaced relation to each other along the surface of a cylindrically shaped magnetic tape or drum 91 adapted to be rotated by a shaft 93 in the direction of the arrow. In this way there will be recorded a separate track for each recording head on the cylinder, these recording tracks $T_a$, $T_b$, $T_c$, $T_d$, $T_e$ and $T_f$ taking the form of circles side by side around the cylinder.

For the purpose of playing back each of the re-recorded circular tracks on drum 91 into a plurality of channels, each of the circular tracks is provided with a plurality of pickup heads. Thus, there are located along the path of track $T_a$, four pickup heads $22a$, $22b$, $22c$ and $22d$ arranged at spaced intervals around the circle. Thus, the heads $22a$ to $22d$ perform on track $T_a$ a similar function to that which the heads $22a$ to $22d$ perform on track 21 in FIG. 5. From this point on, the system in FIG. 26 is the same as that in FIG. 5. Thus, there are provided in FIG. 26 the four reversing switches $25a$ to $25d$, the four amplifiers $23a$ to $23d$, the matching pad 26, the recorder 8 and the photographic strip $10a$ on which the final record is made.

Each of the tracks $T_a$ to $T_f$ in FIG. 26 will be provided with a plurality of playback heads such as $22a$ to $22d$, located around the circle of the track. For clarity of illustration no heads or equipment are shown for any of the circular tracks except track $T_a$. It will also be understood that if the signal information is recorded in frequency modulated form, a system of demodulators, potentiometers, polarity reversing and adding circuits such as those of FIGS. 11 and 12 may be utilized.

The time spacings between the adjacent playback heads $22a$ to $22d$ in FIG. 26 will correspond in general to the time spacings $d_1$, $d_2$ and $d_3$ in FIG. 5 and will be adjusted in a similar manner. The time delays represented by the distance between adjacent playback heads in FIG. 26 can be varied by varying the speed of the drum 92. In consequence the drum can be speeded up to any speed convenient. If for example, a given drum speed should result for a desired time delay between adjacent heads, in too close a spacing between adjacent playback heads $22a$ to $22d$, to suit their physical dimensions, then the drum can be speeded up sufficiently so that the closest spacing of the heads permitted by their physical dimensions will be ample for the purpose.

Another feature of the drum resides in the fact that it may be used in a continuous operation, that is, the same track may continue for more than a single revolution around the drum. This can readily be done by wiping off the record after it has been played back by the last of the playback heads $22a$ to $22d$. Such an arrangement is shown in the form of the erasing heads $91a$, $91b$, $91c$, $91d$, $91e$, $91f$ around the circumference of the circular tracks just in front of the respective recording heads $90a$ to $90f$. Suitable high frequency oscillatory voltage applied to the erasing heads will erase the magnetic tracks in a well-known manner. Thus, after this erasure the tape is ready to record more of the played-back record from the respective recording heads $90a$ to $90f$.

A type of distortion which can sometimes produce serious errors in signal information on a tape or record is phase distortion, that is, unequal time delays imparted to the signal for different frequency components. Such phase distortion will cause an ultimate record of a wave train or transient to differ in differential time relationships from the initial source wave or transient. One possible source of phase distortion is a wave filter. In the case of the head pattern filters illustrated and described herein, it has been ascertained that a "symmetric" pattern of heads produces a zero (or 180°) phase shift with respect to the center of the pattern; while an "anti-symmetric" pattern produces a phase shift which is constant for all frequencies and is equal to +90° (or −90°). It has also been ascertained that an "unsymmetric" pattern can be resolved into a "symmetric" component and an "anti-symmetric" component.

A symmetric pattern is defined as one which has a mirror symmetry about its mid-point. An example of such a symmetric pattern of heads is shown in FIG. 18 which shows that if the pattern be folded back on itself at its midpoint, the lines representing the heads 3 and 4 would exactly overlie the lines representing the heads 2 and 1 respectively. Such a head pattern introduces no phase shift with respect to the center of the pattern, and hence introduces no phase distortion into the spectrum of the waves being scanned.

An anti-symmetric head pattern is defined as one which displays anti-symmetry about its center; that is, it exhibits mirror symmetry with respect to both amplitude and polarity. FIGS. 17 and 19 show examples of anti-symmetric head patterns. For instance, if the pattern of FIG. 17 be folded back on itself at its midpoint, and if the polarities of the lines representing the heads 3 and 4 be reversed, the lines for heads 3 and 4 would then exactly overlie the lines for heads 2 and 1 respectively. Such anti-symmetric head patterns introduce a 90° phase shift into all frequency components being scanned relative to the center of the pattern.

A pattern having an arrangement of symmetry is defined as one which is either symmetric or anti-symmetric.

An unsymmetric pattern is defined as one which is neither symmetric nor anti-symmetric. FIGS. 15 and 16 show examples of unsymmetric patterns, for when these patterns are folded back on themselves at their midpoints, the lines representing the heads on the folded back portion will not exactly overlie the other lines regardless of whether or not polarities are reversed. An unsymmetric pattern introduces a combination of the phase effects of the symmetric type pattern and of the anti-symmetric type pattern. Any unsymmetric pattern can therefore be resolved into a symmetric and an anti-symmetric component.

Figure 27:
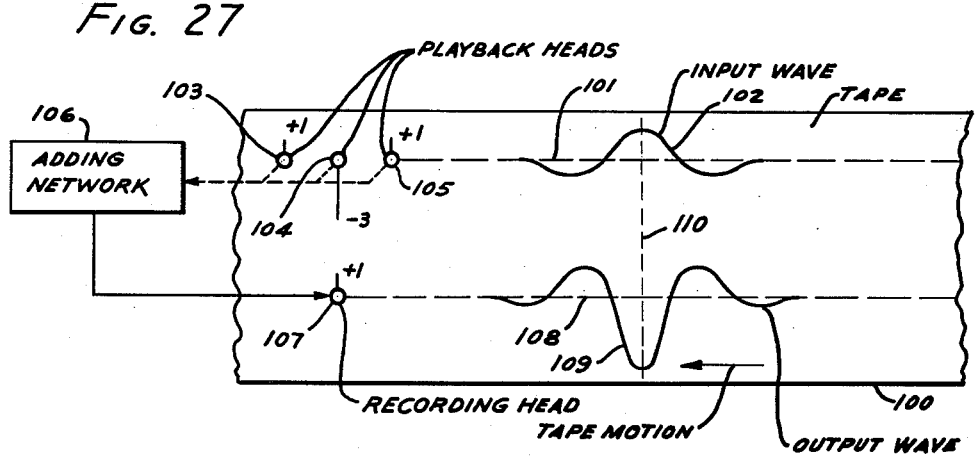
FIG. 27 shows a system of playing back a track on a tape by an array of symmetric playback heads.

To illustrate the phase shift characteristics just mentioned, reference is made to FIG. 27 which shows a portion of magnetic tape 100 assumed to move in the direction of the arrow. The tape track 101 has recorded on it a wavelet or transient which is shown graphically as the wave form 102, for purposes of illustration, this wavelet being symmetric about the time line 110. The terms "symmetric," "anti-symmetric" and "unsymmetric" as applied to waveforms have the same meaning herein as when applied to head patterns. Thus a symmetric wave form is one which has mirror symmetry about its center; and an anti-symmetric wave is one which has anti-symmetry about its center; while an unsymmetric wave is one which is neither symmetric nor anti-symmetric.

The tape track 101 is being played back by an array of three playback heads 103, 104 and 105 whose relative amplifications are symmetrically proportioned as +1, −3 and +1 respectively; these values being arbitrarily selected as one example of a symmetric head pattern. It will be understood that some other symmetric head pattern could be used instead, if desired, either with the same or a different number of heads and with any arbitrarily selected relative amplifications. The output of the playback heads is carried to the usual adding network indicated schematically by the rectangle 106 which is assumed to contain the individual polarity reversing switches and amplifiers for the respective heads, for example, as shown in FIG. 5, or demodulators if such are used. For simplicity of illustration, these individual components are not illustrated in the detail shown in previous figures such as FIGS. 5, 11 and 12, but instead are assumed to be all included in the rectangle 106. The output of the adding network 106 is brought to a single recording head 107 on a magnetic tape which may for convenience be the lower portion of tape 100.

As the tape 100 moves to the left relative to the heads associated with it, the input track 101 is scanned by the playback heads 103, 104, 105; and the instantaneous sums of their contributions is simultaneously recorded as an output track 108 by the recording head 107 which for convenience is arbitrarily given an amplification factor of +1. The recorded output track 108, being the result of the action of all the heads, will contain a wave form or transient 109 responsive to the input transient 102. It is understood that the output wavelet 109 is simply a graphic illustration of the wave form signal impressed on the magnetic tape. Several observations can be made in reference to the output wave form 109. It is observed that this output wavelet 109 is symmetric. Furthermore, with the head 107 in the same time position as the center of the symmetric array 103, 104, 105 there is no time difference between the center of symmetric wavelet 102 and the center of symmetric wavelet 108, as is indicated by the time line 110; that is, no phase distortion is introduced during the filtering process, although all frequency components have been inverted in polarity. Moreover, since the head 107 records the instantaneous outputs of the playback heads, the same result would be obtained if the tape were moved to the right, instead of the left, past the playback head group; that is, the direction of tape motion is immaterial. It will readily be concluded that in general, when any symmetric wave is scanned by any symmetric pattern, a symmetric output wave results; and no phase distortion is incurred.

Figure 29:
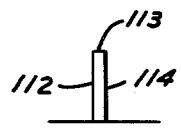
FIG. 29 illustrates the shape of a spike-type pulse.

The fact that the symmetric type head-scanning pattern introduces no phase distortion into the waves being scanned is proven by the illustration in FIG. 28 which shows graphically at A an input wave 111 which is to be sent through the scanning pattern 120 consisting of heads 103, 104, 105 of FIG. 27, and at B an output wave from this scanning pattern. As shown, the input wave has been chosen as a unit spike impulse, that is, a pulse of very short duration, the form of which is shown in exaggerated fashion in FIG. 29. Its leading edge 112 is substantially vertical, its top 113 is very short and flat and its rear edge 114 is substantially vertical. The width 113 is very short compared with measurable increments of time on the tape. For purposes of illustration herein these spike impulses will be shown as single vertical lines. It is physically evident that the output wave from pulse 111 passing heads 103, 104, 105 will appear as shown at B, in FIG. 28; that is, the unit pulse 111 will be acted upon by each of the three heads, in the time spacing and polarities of the heads, to produce the output spikes 115, 116, 117 with the relative amplitudes +1, −3, +1. This output at B is of course symmetric about its midpoint and moreover the midpoint corresponds with the time that the input pulse passes the center of the scanning pattern, as shown by time line 118. On playback the pulse does not have exactly the same wave form as shown in FIG. 29, as on playback it is spread out in time somewhat more than the original pulse; but nevertheless schematically, its amplitude and time position is represented by a vertical line for purpose of illustration.

Since it is in general true that when a scanning pattern produces an impulse response which is symmetric, it introduces no phase distortion into waves being filtered, this impulse response forms a ready means of testing or measuring whether or not a particular head pattern filter will introduce phase distortion when filtering waves.

This proposition can even be stated more broadly, for the filter does not even have to be of the head pattern type in order to perform in this manner (although the head patterns make the process easily understandable). Any electric wave filter, whether it be of the head filter type or an ordinary electric wave filter, whose impulse response is symmetric, introduces no phase distortion into the waves being filtered.

Any filter whose impulse response is anti-symmetric introduces a phase shift of ±90° into waves of all frequencies passing through it. This is illustrated in FIG. 30 where there is schematically indicated an ordinary electric filter network 119, the input wave of which is assumed to be a unit spike impulse 121 as shown as A' of FIG. 30. If the output wave form 122 is found to be symmetric as shown at B' in FIG. 30, then it is known that the filter has introduced no phase distortion. If, however, the output wave response is found to be unsymmetric as shown by wave 123 at C' in FIG. 30, then it is known that the filter has introduced phase distortion into waves which it is filtering. This confirms again that the impulse response method of testing a filter provides a ready means for measuring a physical filtering network to determine whether or not it will introduce phase distortion. Moreover, as will be shown hereinafter, this method will provide a means for determining the extent to which such phase distortion will occur when the impulse response is found not to be symmetric.

In practice, it is often more effective to employ a different type of testing pulse than the "spike" impulse shown at A and A' of FIGS. 28 and 30. Thus as shown in FIGS. 31 and 32, a unit step function (124 and 125) can be used as the input for the scanning pattern 120 and filter 119 respectively. It will be recognized that a step function is merely the integral of the spike impulse. Hence, one would expect the resulting filter output waves to be the integrals of the corresponding output waves shown at B and B' of FIGS. 28 and 30, respectively. This assumption is true; and the output is illustrated by the waveforms 126 and 127 at E and E' of FIGS. 31 and 32, respectively. It is noted that the step response waveform 126 at E is antisymmetric about its midpoint, even though it contains a D.C. component. In other words, a new "zero" amplitude level L could be determined which would divide the D.C. component equally. When this step is performed, it is obvious that antisymmetry exists about the axis L. Whenever the sum of the positive head contributions does not equal the sum of the negative head contributions, the step function response contains a D.C. component. In any event, however, the derivatives of the waves 126 and 127 are replicas of the waveforms at B and B' respectively of FIGS. 28 and 30. These derivatives are shown at F and F' of FIGS. 31 and 32. In practice it is apt to be more convenient to apply the step function test wave, obtain the corresponding output pulse (which is called the step function response) and differentiate the latter wave to obtain the desired impulse response.

The same process is effective for testing any filter response. For example, had the filter been unsymmetric in its impulse response (waveform 123 at C'), then when tested by means of a step function, a new wave 129 (at G' of FIG. 32) would appear. This wave 129 could be differentiated to produce a replica of the unsymmetric impulse response 123 as shown by waveform 130 at H' of FIG. 32. This can be done in a well-known manner by an electrical differentiating network.

The above two processes of determining the phase response conditions of a network can be summed up as follows.

(1) If the impulse response of a filter (whether it be an electric filter or head pattern filter) is symmetric, then that filter introduces no phase distortion in the filtering process.

(2) If the step function response of the filter (whether it be an electric filter or head pattern filter) is antisymmetric, then that filter will introduce no phase distortion in the filtering process.

Figure 33:
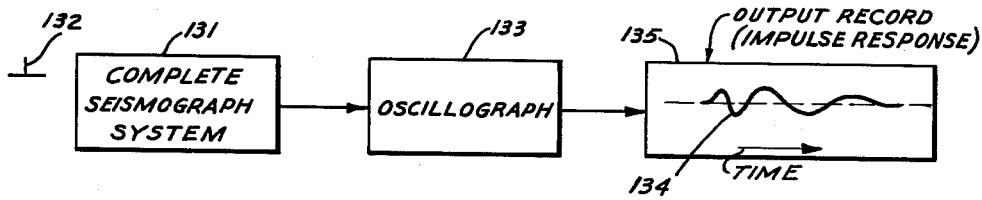
FIG. 33 illustrates the application of a spike pulse to a "complete" seismograph system, and an output record made therefrom.
Figure 34:
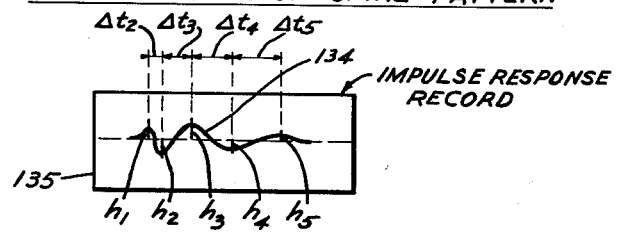
FIG. 34 illustrates the determination of a spike pattern from the record of FIG. 33.
Figure 35:
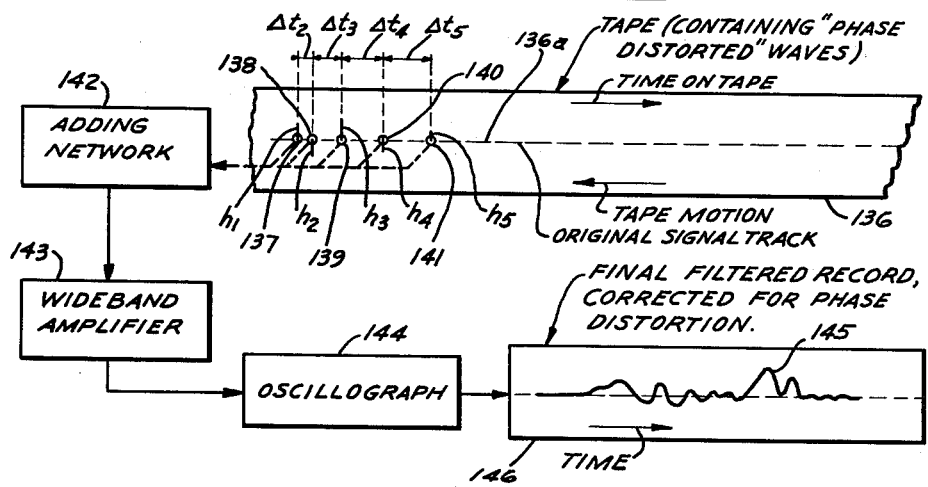
FIG. 35 shows a system for compensating phase distortion.

FIGS. 33, 34 and 35 show arrangements, based on the above-described principles, for avoiding or removing phase distortion. Moreover, the processes involved in these arrangements permit refiltering previously filtered records in such a way as to remove all phase distortion which may have previously been introduced.

FIG. 33 shows in block diagram form a network 131 which represents, that is, is equivalent to a "complete seismograph" system. Such a complete seismograph system is described in the publication by United Geophysical Corporation, Pasadena, California, entitled "The Synthesis of Seismograms From Well Log Data," copyright 1955 by United Geophysical Corporation. In that publication there is illustrated and described a complete system for synthesizing seismograms by the aid of basic well log data. Such apparatus is described in that publication at page 9 et seq. thereof, wherein it is referred to as a seisyn computor. FIG. 9 of that publication photographically illustrates the apparatus and FIGS. 10 and 14 represent it schematically in block diagram form. It will be understood that the network 131 of FIG. 33 may be taken to represent such a complete seismograph system, such that waves passing through network 131 are subjected to the same conditions and distortions as in actual seismograph system. It should be understood, however, that the network 131 could if desired be taken to represent any network such as a filter, including a head filter; in which case the waves passing through it will of course, be subjected to such distortions and conditions as are imposed by such network.

Assuming the network 131 represents a "complete seismograph" system, it preferably includes as components thereof, the following: a component which may be termed a "seismic pulse network" to simulate the shape of the initial seismic pulse propagated into the earth by the dynamite charge; the geophone; the amplifier; the filters; the recording and playback mechanism and even the recording galvanometer. This network equivalent to the complete seismograph system may be tested by impressing on it a unit spike pulse 132 as shown. The output of the system is carried to the oscillograph 133 which makes a photographic record 134 on photographic paper 135. (If the oscillograph is of the conventional type employing galvanometers, the galvanometers should be of the same type which will be used to reproduce the final corrected waves); and in this case the effects of the galvanometer are not included in system 131. The record 134 will contain a wave which will be the impulse response of the input pulse 132.

Instead of the unit pulse 132, there could, of course, be employed a step function such as that shown at D in FIG. 31. The corresponding step function response would then be recorded at the output as shown in FIG. 31. This output can then be differentiated by suitable differentiating equipment in a well known manner to produce the equivalent of the impulse response of the complete seismograph. The use of such differentiating equipment has been contemplated in connection with FIG. 31 at F.

Having thus determined the impulse response of the seismograph system, it can be represented by a spike pattern as shown in FIG. 34; which can be accomplished by the method described in connection with FIGS. 15 and 16. Thus in FIG. 34 the lobes of the response transient 134 have applied to them the vertical lines $h_1$, $h_2$, $h_3$, $h_4$ and $h_5$ passing through the centroids of the lobes, the lengths of these lobes being equal to the areas of the respective lobes. The time intervals $\Delta t_2$, $\Delta t_3$, $\Delta t_4$ and $\Delta t_5$ are determined by the time distances between adjacent centroids. The lines $h_1$ to $h_5$ and the time intervals $\Delta t_2$ to $\Delta t_5$ will determine the spacings, relative amplifications and polarities of five corresponding heads of a head pattern. If desired, more than one head may be used to represent each lobe, as illustrated schematically in FIGS. 20 and 21.

FIG. 35 illustrates how the phase distortion introduced by the system or network 131 can be compensated by playing back a magnetic tape, such as may be taken in a seismograph operation in the field, through a head pattern set in accordance with the spike representation of FIG. 34. The tape 136 is assumed to contain a track 136a magnetically recorded thereon which may, for example, have been recorded thereon in a seismic operation in the field by use of a dynamite charge; the detected response from which is sent through the network 131 of FIG. 33. The head pattern represented by FIG. 34 is provided by playback heads 137, 138, 139, 140 and 141. The vertical lines $h_1$, $h_2$, $h_3$, $h_4$ and $h_5$, similar to the same designated lines in FIG. 34, are applied to these playback heads simply to note the polarities and relative amplifications of the respective heads in accordance with FIG. 34. The time spacings of the heads, $\Delta t_2$ to $\Delta t_5$, is the same as in FIG. 34. The outputs from the respective playback heads are carried to a suitable network 142 referred to as an adding network which can include the same or similar components as is included in the adding network 106 of FIG. 27. If further amplication is needed, the output of the adding network can be brought to a wide band amplifier 143 which will uniformly amplify all frequencies being transmitted; and the output of amplifier 143 is brought to an oscillograph 144 which records the totalized output as wave 145 on the photographic strip 146. It is noted that the time scale on the tape and the time scale of the head pattern both progress in the same direction. In this operation the first lobes of the transient on the tape first reach the playback heads which represent the last lobes of the impulse response waveform. The last lobes of the transient are of course the last to leave the head pattern, the heads representing the first lobes of the impulse response being passed last by the transient. Since this constitutes a reversal from the usual relative directions, it is herein referred to as the "reverse sense," even though the time directions of the time scale and of the head pattern are the same.

It will be understood that the process described in connection with FIG. 35 may be applied to more than one channel at a time. Thus, a number of parallel signal channels may be placed on the magnetic tape 136 and such different channels may represent different signals, or if desired they could represent parallel channels from the same signal. Any of the techniques described hereinbefore for arranging heads or producing parallel channels or tracks can be applied to the arrangement of FIG. 35.

The final record 146 in FIG. 35 contains a wave train which may be considered to be the summation of many impulse transients each of which has been corrected for any phase distortion which was introduced during the original transmission of the waves through a network such as the network 131 of FIG. 33. Thus, any unequal time delays for different frequencies in the range of frequencies being transmitted, which have been produced in a filtering operation such as by a network 131, are compensated so that the time delays of all frequencies in the range as they appear on the final record 146, are equal. This phase correction is produced by the direction in which the tape 136 passes by the playback heads 137–141.

Although the correction of phase distortion results from the reverse sense in which the tape 136 passes the playback heads, it should be understood that by creating the reversal in some other manner, the motion of the tape 136 could be in the opposite direction while still producing the phase correction. If the motion of the tape is opposite to that indicated in FIG. 35, the reversal of direction could be produced, for example, by reversing the final output seismograph on the record 146 end-for-end. This can be done in a well-known manner, for example by changing the direction of the photographic strip 146 in passing through the oscillograph.

It is noted that the time spacings between the heads in FIG. 35 are not equal, that is, $\Delta t_2$ to $\Delta t_5$ do not have the same values. It should be understood that it is possible even though not necessary, for these time intervals all to have the same value.

The methods of phase distortionless filtering described herein ordinarily exert some amount of amplitude filtering, as is illustrated for example in FIG. 18. It should be recognized that it may sometime be desirable to apply phase correction and also additional amplitude filtering. It is within the scope of the present invention to employ a head pattern combination which will produce such results. It is evident that once a phase correcting pattern has been established, then any desired combination of symmetric patterns may be arranged in a tandem manner without introducing phase distortion into the system.

While the discussion of FIGS. 33–35 has indicated that the process and system are especially applicable to seismic operations including a "complete" seismograph system, it will readily be understood that the arrangements and processes of phase correction which have been described are applicable in general to any filtering process.

FIG. 36 illustrates an example of phase correction employing the method illustrated in FIGS. 33–35. There is shown a network 131 which can represent any filtering device or system; but the particular system indicated is a "complete" seismograph system as represented in FIG. 33; and it is indicated that it is to have an input applied to it with an output taken from it. Assuming that a spike impulse is applied at its input, the impulse response is as shown by wave form 147 at H in FIG. 36. This wave form is unsymmetric, its spike representation being shown at I in FIG. 36 to comprise the three vertical lines 148, 149 and 150. The three spikes are assumed to have relative amplifications of plus 2, minus 3 and plus 1 as shown and the time spacings between them, $\Delta t_6$ and $\Delta t_7$ are unequal, $\Delta t_7$ being twice the time and interval of $\Delta t_6$. By applying to this response wave at H, a head pattern according to the spike representation shown at I, oriented in the same time direction, that is in the "reverse" sense, as illustrated in FIG. 35, there is had the resulting phase corrected wave 151, shown at J of FIG. 36. This is the wave form which would appear in the record 146, when the arrangement of FIG. 35 is used. It is noted that this output wave 151 is symmetrical, which shows that the phase distortion originally introduced by the network 131, as shown by the impulse response 147, has now been removed. All frequency components of wave 141 have now incurred the same time delay in passing through the entire system.

For purpose of illustration there is illustrated at J of FIG. 36 the spike output pattern representation of the wave corresponding to the output wave 151 and resulting from the "reverse" sense application of the head pattern at I to the impulse response at H. The numerals plus 2, minus 3, minus 6, plus 14, minus 6, minus 3, and plus 2 for the successive spikes are the result of multiplying out the values at H and I. In addition to the phase effects of the phase correction process, a degree of refiltering of the amplitudes of different frequency components occurs. Actually, the amplitude response of a phase correcting scanning pattern used to correct phase distortion of an original filter, is about the same as that of the original filter. In fact, the amplitude response of the phase correcting pattern will be exactly the same as that of the original filter if the original filter be used as the scanning pattern. Since the phase correction process approximately doubles the original effects of amplitude filtering in a filter it is apparent that if a certain amount of over-all amplitude filtering be desired, the original filtering can be arranged to produce half the desired effect. The phase correction process will then produce the other half.

It will be recognized that in accordance with the present invention it is possible to filter waves without introducing phase distortion, this being accomplished by specific types of head patterns. It has further been shown that if there are being used waves which have previously been subjected to phase distortion, as by earlier filtering, then the over-all effects of phase distortion can be removed by refiltering in a phase correction system as illustrated in FIGS. 33, 34 and 35.

By these systems and processes there are provided effective expedients to aid in the better handling and recording of seismograph information; and this ultimately leads to more accurate handling of waves of different frequency components representing different layers in the ground.

Although the phase correcting arrangements have important application to seismic work, it will be understood that they are applicable to electric circuitry in general wherein waves are filtered.

This application is a continuation-in-part of my copending application Serial Number 349,407, filed April 17, 1953, for Wave Transmission System, now Patent No. 2,916,724.

I claim:

1. The method of removing phase distortion from waves passing through a network which comprises impressing a pulse on the input of the network and recording the impulse response, then establishing a pattern of separate playback devices having individual outputs with time positions, relative amplifications and polarities situated at the positions of the centroids of successive lobes of the impulse response, then sending a signal through the network and making a reproducible record thereof, then playing back said reproducible record through said pattern of devices, combining the outputs of said devices and making a record of said combined outputs.

2. The method of removing phase distortion from waves passing through a network which comprises impressing a step function wave form on the input of the network and recording the response thereto, then differentiating the recorded response, then establishing a pattern of playback devices with time positions, relative amplifications and polarities in accordance with the derivative of said response, then sending a signal through the network and making a reproducible record thereof, then playing back said reproducible record through said pattern of devices, combining the outputs of said devices and making a record of said combined outputs.

References Cited in the file of this patent

UNITED STATES PATENTS

| | | |
|---|---|---|
| 2,024,900 | Wiener et al. | Dec. 17, 1935 |
| 2,105,318 | Goldsmith | Jan. 11, 1938 |
| 2,128,257 | Lee et al. | Aug. 30, 1938 |
| 2,263,376 | Blumleine et al. | Nov. 18, 1941 |
| 2,275,735 | Cloud | Mar. 10, 1942 |
| 2,417,069 | Farkas | Mar. 11, 1947 |
| 2,531,642 | Potter | Nov. 28, 1950 |
| 2,566,189 | Gloess | Aug. 28, 1951 |
| 2,620,890 | Lee et al. | Dec. 9, 1952 |
| 2,684,468 | McClure et al. | July 20, 1954 |

OTHER REFERENCES

Kallmann: "Proceedings of the I.R.E.," vol. 28, July 1940, pages 302–210.

UNITED STATES PATENT OFFICE
CERTIFICATE OF CORRECTION

Patent No. 3,045,207                                    July 17, 1962

Raymond A. Peterson

It is hereby certified that error appears in the above numbered patent requiring correction and that the said Letters Patent should read as corrected below.

Column 8, line 25, for "phase" read -- pulse --; column 11, lines 43 and 44, for "play-system" read -- playback system --.

Signed and sealed this 5th day of November 1963.

(SEAL)
Attest:

ERNEST W. SWIDER
Attesting Officer

EDWIN L. REYNOLDS

Acting Commissioner of Patents